(12) United States Patent
Heo et al.

(10) Patent No.: US 12,468,347 B2
(45) Date of Patent: Nov. 11, 2025

(54) ELECTRONIC DEVICE INCLUDING STRUCTURE AGAINST FOREIGN SUBSTANCES

(71) Applicant: SAMSUNG ELECTRONICS CO., LTD., Suwon-si (KR)

(72) Inventors: Changryong Heo, Suwon-si (KR); Valeriy Prushinskiy, Suwon-si (KR); Minuk Kim, Suwon-si (KR); Junghyeon Kim, Suwon-si (KR); Byounguk Yoon, Suwon-si (KR); Hoondo Heo, Suwon-si (KR); Suk Hyun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 205 days.

(21) Appl. No.: 17/834,449

(22) Filed: Jun. 7, 2022

(65) Prior Publication Data

US 2022/0300042 A1   Sep. 22, 2022

Related U.S. Application Data

(63) Continuation of application No. PCT/KR2020/015936, filed on Nov. 13, 2020.

(30) Foreign Application Priority Data

Dec. 10, 2019   (KR) .................. 10-2019-0163761

(51) Int. Cl.
*G06F 1/16* (2006.01)
*H04M 1/02* (2006.01)

(52) U.S. Cl.
CPC .......... *G06F 1/1656* (2013.01); *G06F 1/1652* (2013.01); *G06F 1/1681* (2013.01);
(Continued)

(58) Field of Classification Search
CPC .... G06F 1/1656; G06F 1/1652; G06F 1/1681; G06F 1/16; G06F 1/1616; G06F 1/1637;
(Continued)

(56) References Cited

U.S. PATENT DOCUMENTS 5,743,409 A * 4/1998 Nakahara .......... H01L 21/67386
  206/719
7,426,406 B2 * 9/2008 Maatta ................. H04M 1/022
  455/575.8
(Continued)

FOREIGN PATENT DOCUMENTS

CN      208316809 U       1/2019
JP      H05127775 A   *   5/1993
(Continued)

OTHER PUBLICATIONS

Korean Office Action corresponding to Application No. 10-2019-0163761 with English translation; Dated Nov. 7, 2023.
(Continued)

*Primary Examiner* — Allen L Parker
*Assistant Examiner* — Martin Antonio Asmat Uceda
(74) *Attorney, Agent, or Firm* — CANTOR COLBURN LLP

(57) ABSTRACT

Electronic devices include a first housing, a second housing, a display arranged between the first housing and the second housing, and a hinge structure of which at least a portion is arranged between the first housing and the second housing to support a hinge operation. A hinge housing is provided in which at least a portion of the hinge structure is receivable. At least one cavity structure defines at least one cavity in at least a partial region of at least one of the hinge housing, the first housing, and the second housing to prevent flowing or diffusion of incoming foreign matter.

14 Claims, 20 Drawing Sheets

(52) U.S. Cl.
CPC ....... *H04M 1/0216* (2013.01); *H04M 1/0268* (2013.01); *H04M 1/0266* (2013.01); *H04M 2201/38* (2013.01)

(58) Field of Classification Search
CPC . G06F 1/1641; H04M 1/0216; H04M 1/0268; H04M 2201/38; H04M 1/0266; H04M 1/0214; H04M 1/022; F16C 11/04; G09F 9/301
See application file for complete search history.

(56) References Cited

U.S. PATENT DOCUMENTS

| | | | | |
|---|---|---|---|---|
| 7,512,426 | B2 * | 3/2009 | Maatta | H04M 1/0243 455/575.1 |
| 8,060,168 | B2 | 11/2011 | Horrdin et al. | |
| 8,804,349 | B2 * | 8/2014 | Lee | G06F 1/1641 361/679.01 |
| 9,235,239 | B2 * | 1/2016 | van Dijk | H04M 1/0268 |
| 9,348,450 | B1 * | 5/2016 | Kim | H04M 1/0268 |
| 10,019,038 | B2 * | 7/2018 | Garelli | E05D 11/0081 |
| 10,104,790 | B2 * | 10/2018 | Lee | G06F 1/1681 |
| 10,154,328 | B2 * | 12/2018 | Watson | H04R 19/04 |
| 10,416,710 | B2 * | 9/2019 | Mizoguchi | G06F 1/1641 |
| 10,550,880 | B2 * | 2/2020 | Hsu | E05D 11/082 |
| 10,635,141 | B2 * | 4/2020 | Silvanto | G06F 1/1683 |
| 10,642,318 | B1 * | 5/2020 | Lehmann | G06F 3/016 |
| 10,782,742 | B1 * | 9/2020 | Spencer | G06F 1/163 |
| 10,928,860 | B2 * | 2/2021 | Park | G06F 1/1681 |
| 11,032,402 | B2 * | 6/2021 | Liu | H04M 1/0268 |
| 11,294,431 | B2 * | 4/2022 | Torres | G06F 1/1681 |
| 11,379,005 | B2 * | 7/2022 | Xue | H04M 1/0268 |
| 11,914,433 | B2 * | 2/2024 | Liao | H04M 1/0268 |
| 2006/0201474 | A1 * | 9/2006 | Arseneau | F02B 57/00 123/244 |
| 2006/0238968 | A1 * | 10/2006 | Maatta | H04N 1/00525 361/679.01 |
| 2009/0054115 | A1 | 2/2009 | Horrdin et al. | |
| 2009/0247236 | A1 * | 10/2009 | Kajiwara | H04M 1/18 455/566 |
| 2017/0374749 | A1 * | 12/2017 | Lee | G06F 1/1652 |
| 2019/0244563 | A1 * | 8/2019 | Kishimoto | G09F 9/301 |
| 2019/0278338 | A1 * | 9/2019 | Siddiqui | G06F 1/1656 |
| 2020/0166974 | A1 * | 5/2020 | Ai | H04M 1/0216 |
| 2020/0198024 | A1 * | 6/2020 | Yoshikane | B25F 5/00 |

FOREIGN PATENT DOCUMENTS

| | | | |
|---|---|---|---|
| JP | H10280780 A | | 10/1998 |
| JP | 2007060323 A | | 3/2007 |
| JP | 2009186006 A | | 8/2009 |
| JP | 2010126878 A | | 6/2010 |
| KR | 20050037881 A | * | 4/2005 |
| KR | 20160083608 A | | 7/2016 |
| KR | 20180085506 A | * | 7/2018 |

OTHER PUBLICATIONS

Korean Notice of Allowance corresponding to Application No. 10-2019-0163761; Dated May 29, 2024.

* cited by examiner

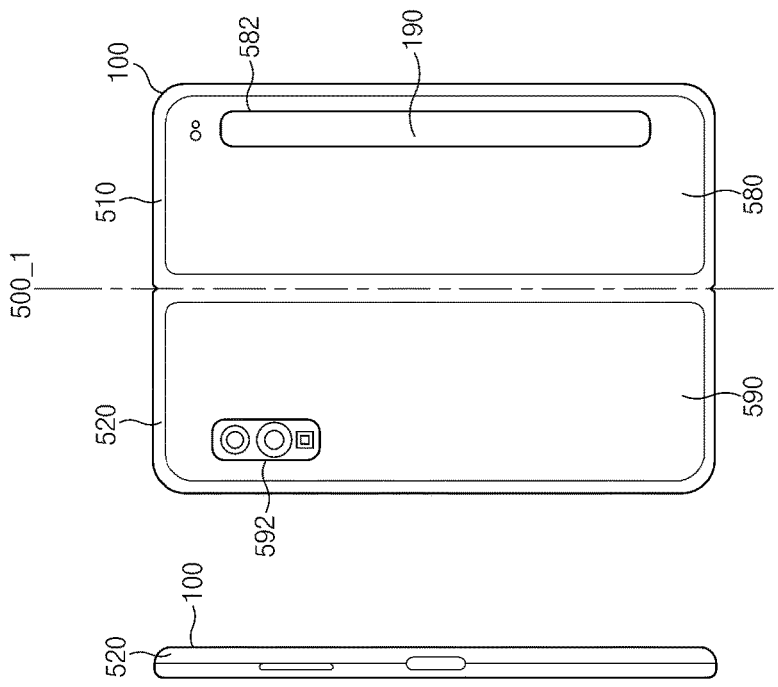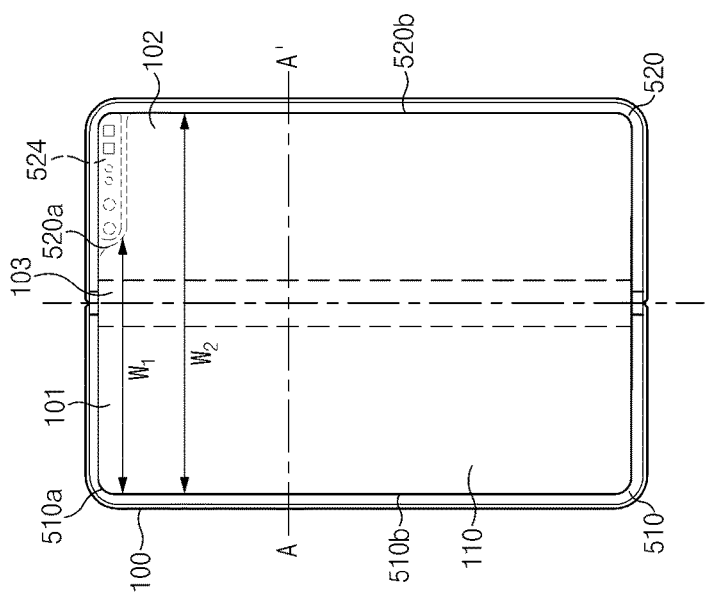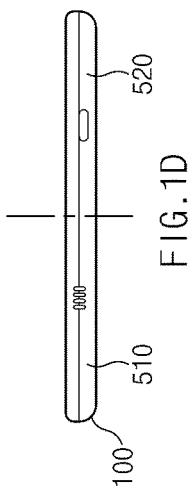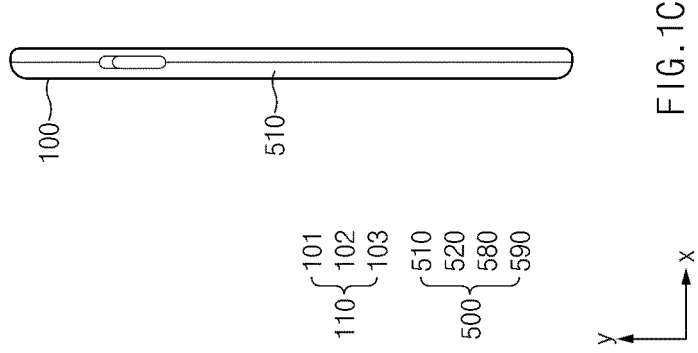

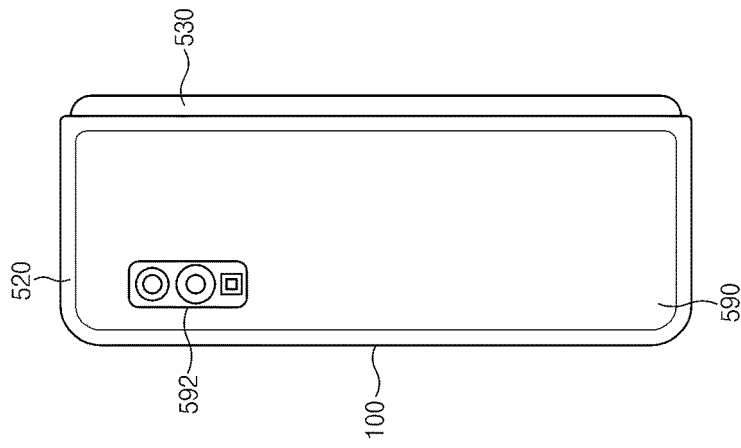
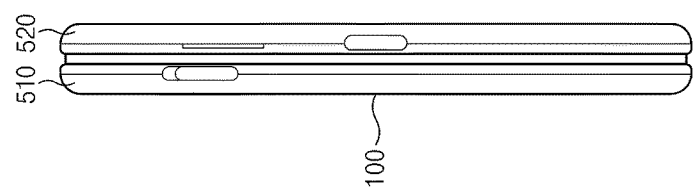
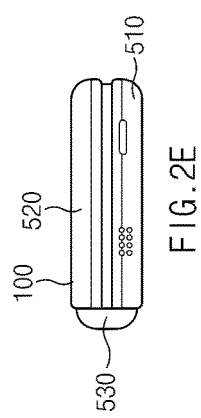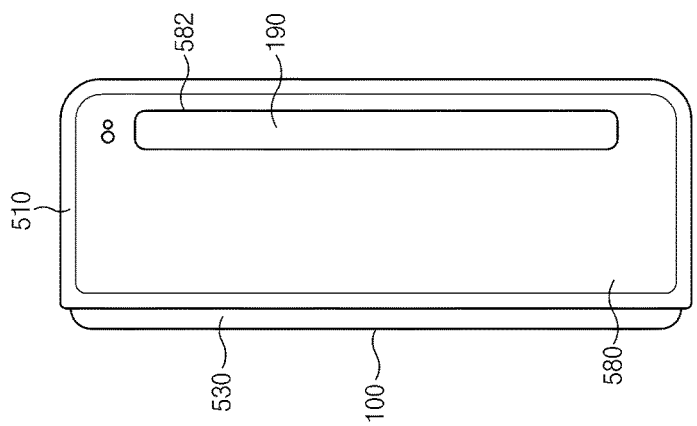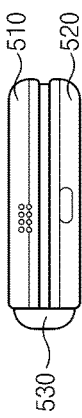
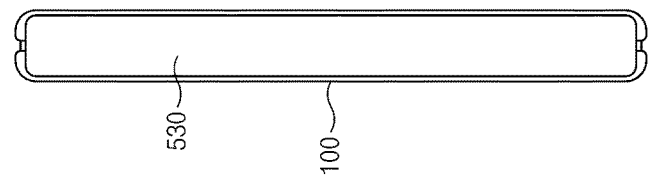

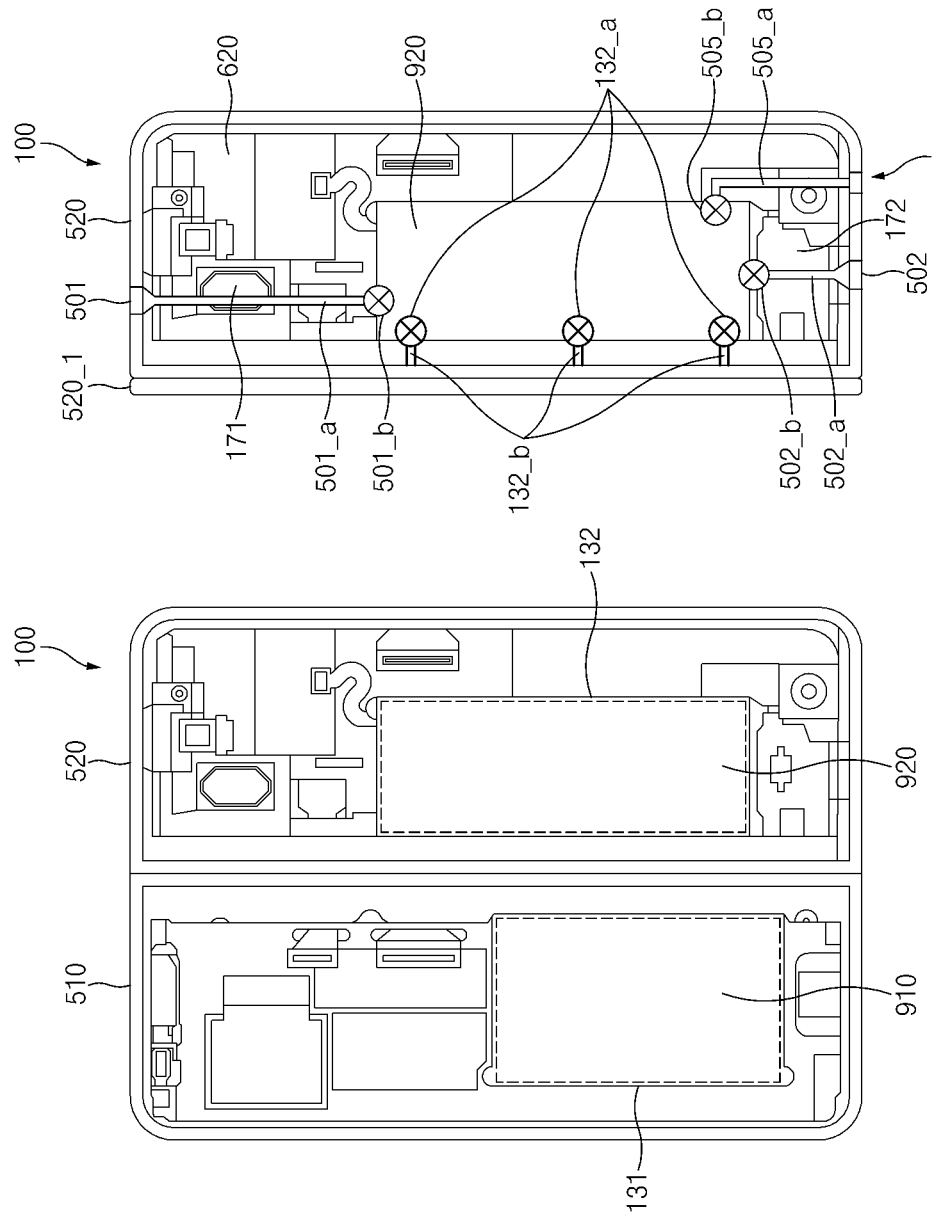

ELECTRONIC DEVICE INCLUDING STRUCTURE AGAINST FOREIGN SUBSTANCES

TECHNICAL FIELD

This application claims priority to Korean Patent Application No. 10-2023-0079515, filed on Jun. 21, 2023, and all the benefits accruing therefrom under 35 U.S.C. § 119, the content of which in its entirety is herein incorporated by reference.

Various embodiments of the disclosure relate to an electronic device including a structure against foreign matter.

BACKGROUND ART

A portable electronic device such as a smartphone may provide various functions, such as telephone calls, video playback, and Internet searching, based on various types of applications. A user may want to use the aforementioned functions through a wider screen than that of the portable electronic device. However, portability may be decreased with an increase in screen size. Accordingly, a foldable portable electronic device capable of increasing portability using a foldable structure is being developed.

DISCLOSURE

Technical Problem

In the foldable electronic device, a hinge structure may be connected with adjacent housings and may be disposed to perform rotary motion while supporting the housings during rotation of the housings through a predetermined angle. Various structures may be disposed in relation to a hinge operation of the housings. However, in the case of the foldable electronic device, a gap (or, a housing air passage) may be formed in a folded area, and foreign matter (dust, sand, powder, particulate matter, etc.) may be easily introduced through the gap. When the foreign matter introduced through the gap is located under a display, the display may be damaged by the hinge operation. Furthermore, when the introduced foreign matter is caught in the hinge structure, the hinge operation may not be normally performed.

Technical Solution

Various embodiments provide an electronic device having a structure against foreign matter that prevents infiltration of foreign matter into the foldable electronic device.

Furthermore, various embodiments provide an electronic device that identifies a state in which foreign matter is introduced into the foldable electronic device.

In addition, various embodiments provide an electronic device having a release structure that releases foreign matter introduced into the foldable electronic device.

An electronic device according to various embodiments of the disclosure includes a first housing, a second housing, a display disposed on the first housing and the second housing, a hinge structure that supports a hinge operation, at least a portion of the hinge structure being disposed between the first housing and the second housing, a hinge housing in which at least a portion of the hinge structure is seated, and at least one cavity structure that includes at least one cavity formed in at least a partial area of at least one of the hinge housing, the first housing, or the second housing and prevents flow or diffusion of introduced foreign matter.

Advantageous Effects

The electronic device having the structure against foreign matter according to various embodiments may prevent a flow of foreign matter introduced through the housing air passages between the hinge housing and the housings, thereby preventing damage to a device component, such as the display of the foldable electronic device.

Furthermore, the electronic device according to various embodiments may support removing foreign matter introduced from outside the electronic device.

In addition, the electronic device according to various embodiments may identify a state in which foreign matter is introduced, may guide foreign matter removal, and may maintain a clean internal state through removal of foreign matter, thereby preventing a device component of the electronic device from being contaminated or damaged.

Various other aspects and effects provided by the hinge structure, and electronic devices including the same, according to various embodiments may be mentioned depending on embodiments in the detailed description of the disclosure.

DESCRIPTION OF DRAWINGS

FIG. 1A is a front elevation view illustrating a flat state of a foldable electronic device according to an embodiment of the present disclosure.

FIG. 1B is a right-side elevation view of the foldable electronic device of FIG. 1A.

FIG. 1C is a left-side elevation view of the foldable electronic device of FIG. 1A.

FIG. 1D is a bottom-up view of the foldable electronic device of FIG. 1A.

FIG. 1E is a top-down view of the foldable electronic device of FIG. 1A.

FIG. 1F is a rear elevation view of the foldable electronic device of FIG. 1A.

FIG. 2A is a front elevation view illustrating a folded state of the foldable electronic device according to an embodiment of the present disclosure.

FIG. 2B is a right-side elevation view of the foldable electronic device of FIG. 2A.

FIG. 2C is a left-side elevation view of the foldable electronic device of FIG. 2A.

FIG. 2D is a bottom-up view of the foldable electronic device of FIG. 2A.

FIG. 2E is a top-down view of the foldable electronic device of FIG. 2A.

FIG. 2F is a rear elevation view of the foldable electronic device of FIG. 2A.

FIG. 9A is a view illustrating one example of an air passage of the electronic device related to removal of foreign matter according to various embodiments.

FIG. 9B is a view illustrating the electronic device of FIG. 9A in a folded state.

MODE FOR INVENTION

Figure 3A:
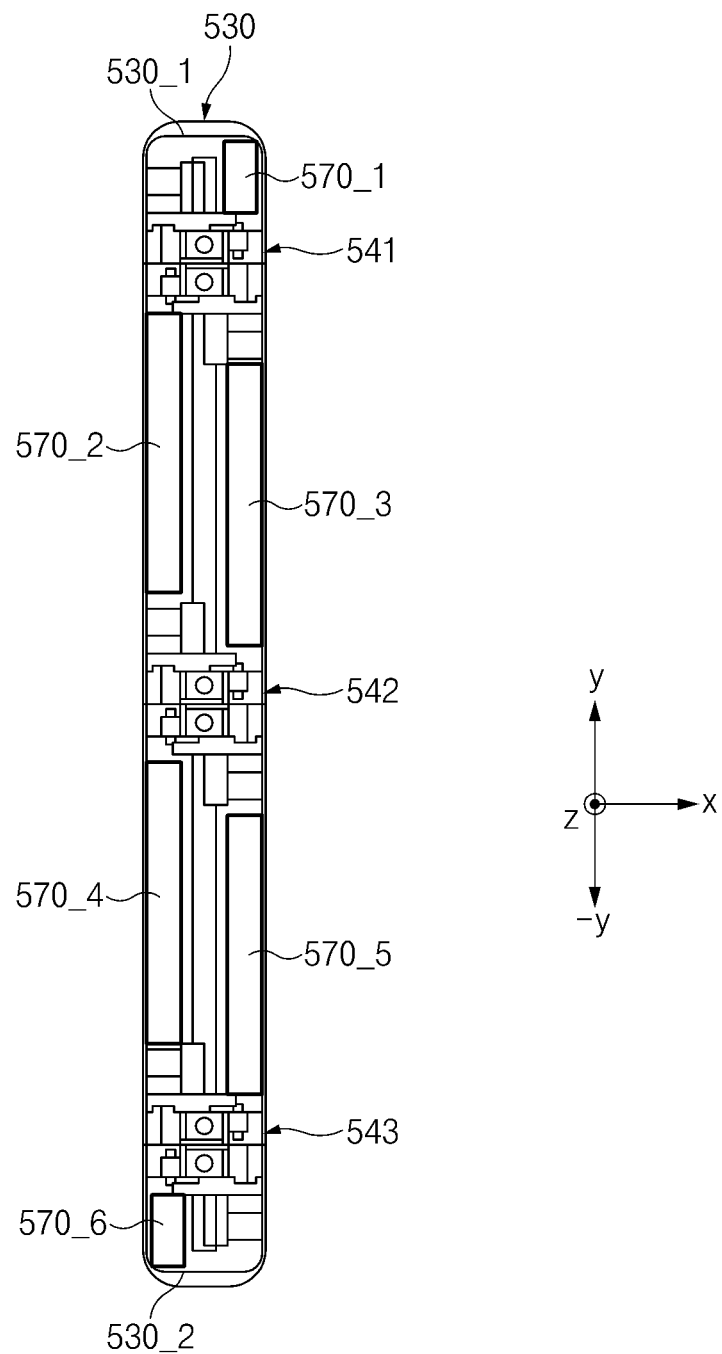
FIG. 3A is a view illustrating one example of a cavity structure of a hinge housing according to various embodiments.

Hereinafter, various embodiments of the disclosure may be described with reference to accompanying drawings. Accordingly, those of ordinary skill in the art will recognize that modifications, equivalents, and/or alternatives on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts-) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIGS. 1A-1F illustrate a flat state of a foldable electronic device according to an embodiment, and FIGS. 2A-2F illustrate a folded state of the foldable electronic device according to an embodiment.

Referring to FIGS. 1A-1F and 2A-2F, in an embodiment, the electronic device 100 may include a foldable housing 500, a hinge housing 530 (or, a hinge cover) that covers at least part of a foldable portion of the foldable housing 500, and a flexible or foldable display 110 disposed in at least a partial area of a space formed by the foldable housing 500. In this disclosure, a surface on which the display 110 is disposed is defined as a first surface or a front surface of the electronic device 100. A surface facing away from the front surface is defined as a second surface or a rear surface of the electronic device 100. Furthermore, a surface surrounding at least a partial space between the front surface and the rear surface is defined as a third surface or a side surface of the electronic device 100.

In an embodiment, the foldable housing 500 may include a first housing 510, a second housing 520 including a sensor area 524, a first back cover 580, and a second back cover 590. The foldable housing 500 of the electronic device 100 is not limited to the form and coupling illustrated in FIGS. 1A-1F and 2A-2F and may be implemented by a combination and/or coupling of other shapes or components. For example, in another embodiment, the first housing 510 and the first back cover 580 may be integrally formed with each other, and the second housing 520 and the second back cover 590 may be integrally formed with each other.

In the illustrated embodiment, the first housing 510 and the second housing 520 may be disposed on opposite sides with respect to a virtual folding axis 500_1 and may have shapes in which at least portions are entirely symmetrical to each other with respect to the folding axis 500_1. As will be described below, the angle between the first housing 510 and the second housing 520 or the distance from one point of the first housing 510 to one point of the second housing 520 may vary depending on whether the electronic device 100 is in a flat state (FIGS. 1A-1F), a folded state (FIGS. 2A-2F) (e.g., a state in which one surface of the first housing 510 and one surface of the second housing 520 are disposed parallel to each other and face each other), or a specific mounting state. In the illustrated embodiment, unlike the first housing 510, the second housing 520 may additionally include the sensor area 524 in which various sensors are disposed. However, the first housing 510 and the second housing 520 may have mutually symmetrical shapes in the other areas. Further in some embodiments, the first housing 510 may include an additional sensor area (not shown) or may include the sensor area and the second housing may not.

In an embodiment, as illustrated in FIGS. 1A-1F, the first housing 510 and the second housing 520 may include a recess that accommodates the display 110 (or, a box structure that has a periphery at least partially protruding upward beyond a central portion and in which at least one sidewall is included, at least a portion of a bottom surface of a recess being removed and open). In the illustrated embodiment, due to the sensor area 524, the recess may have two or more different widths in a direction perpendicular to the folding axis 500_1.

For example, the recess may have (1) a first width W1 between a first portion 510a of the first housing 510 that is parallel to the folding axis 500_1 and a first portion 520a of the second housing 520 that is formed on the periphery of the sensor area 524 and (2) a second width W2 formed by a second portion 510b of the first housing 510 and a second portion 520b of the second housing 520 that does not correspond to the sensor area 524 and that is parallel to the folding axis 500_1. In this case, the second width W2 may be formed to be longer than the first width W1. In other words, the first portion 510a of the first housing 510 and the first portion 520a of the second housing 520 that have mutually asymmetrical shapes may form the first width W1 of the recess, and the second portion 510b of the first housing 510 and the second portion 520b of the second housing 520 that have mutually symmetrical shapes may form the second width W2 of the recess. In an embodiment, the first portion 520a and the second portion 520b of the second housing 520 may have different distances from the folding axis 500_1. The width of the recess is not limited to the illustrated example. In various embodiments, the recess may have a plurality of widths depending on the form of the sensor area 524 or the asymmetrical portions of the first housing 510 and the second housing 520.

In an embodiment, at least a portion of the first housing 510 and at least a portion of the second housing 520 may be formed of a metallic material or a non-metallic material that has a stiffness of a selected magnitude to support the display 110.

In an embodiment, the sensor area 524 may be formed to have a certain area adjacent to one corner of the second housing 520. However, the arrangement, shape, and size of the sensor area 524 are not limited to the illustrated example. For example, in another embodiment, the sensor area 524 may be provided in another corner of the second housing 520 or in any area between an upper corner and a lower corner. In an embodiment, components for performing various functions embedded in the electronic device 100 may be exposed on the front surface of the electronic device 100 through the sensor area 524 or one or more openings formed in the sensor area 524. In various embodiments, the components may include various types of sensors. The sensors may include, for example, at least one of a front camera, a receiver, or a proximity sensor. According to various embodiments, the sensor area 524 may be disposed under the display 110 such that at least a portion is hidden by the display 110. Alternatively, the sensor area 524 may be exposed to the outside without being hidden by the display 110. In this case, a partial area of the display 110 having a rectangular shape as a whole may be cut away so as not to hide the sensor area 524. In this case, the sensor area 524 may be mounted on one side of a printed circuit board disposed inside the second housing 520.

The first back cover 580 may be disposed on one side of the folding axis 500_1 on the rear surface of the electronic device 100. For example, the first back cover 580 may have a substantially rectangular periphery, and the periphery may be surrounded by the first housing structure 510. Similarly, the second back cover 590 may be disposed on an opposite side of the folding axis 500_1 on the rear surface of the electronic device 100, and the periphery may be surrounded by the second housing 520.

In the illustrated embodiment, the first back cover 580 and the second back cover 590 may have substantially symmetrical shapes with respect to the folding axis 500_1. However, the first back cover 580 and the second back cover 590 do not necessarily have to have mutually symmetrical shapes. In another embodiment, the electronic device 100 may include the first back cover 580 and the second back cover 590 in various shapes. In another embodiment, the first back cover 580 may be integrally formed with the first housing 510, and the second back cover 590 may be integrally formed with the second housing 520.

In an embodiment, the first back cover 580, the second back cover 590, the first housing 510, and the second housing 520 may form a space in which various components (e.g., a printed circuit board, a battery, etc.) of the electronic device 100 are disposed. In an embodiment, one or more components may be disposed, or visually exposed, on the rear surface of the electronic device 100. For example, at least a portion of a sub-display 190 may be visually exposed through a first rear area 582 of the first back cover 580. In another embodiment, one or more components or sensors may be visually exposed through a second rear area 592 of the second back cover 590. In various embodiments, the sensors may include proximity sensors, rear cameras, or other various components and/or sensors.

Referring to FIGS. 2A-2F, the hinge housing 530 may be disposed between the first housing 510 and the second housing 520 and may be configured to hide an internal component (e.g., a hinge structure). In an embodiment, the hinge housing 530 may be hidden by a portion of the first housing 510 and a portion of the second housing 520, or may be exposed to the outside, depending on a state (e.g., a flat state or an unfolded state, or a folded state) of the electronic device 100.

For example, when the electronic device 100 is in a flat state as illustrated in FIGS. 1A-1F, the hinge housing 530 may be hidden by the first housing 510 and the second housing 520 and may not be exposed to the outside. In contrast, when the electronic device 100 is in a folded state (e.g., a fully folded state) as illustrated in FIGS. 2A-2F, the hinge housing 530 may be exposed to the outside from between the first housing 510 and the second housing 520. In an intermediate state in which the first housing 510 and the second housing 520 are folded with a certain angle (e.g., between 180° (flat) and 0° (completely folded)), the hinge housing 530 may be partially exposed to the outside from between the first housing 510 and the second housing 520. However, in this case, the exposed area may be smaller than that in the fully folded state. In an embodiment, the hinge housing 530 may include a curved surface.

The display 110 may be disposed over the space formed by the foldable housing 500. For example, the display 110 may be seated in the recess formed by the foldable housing 500 and may form most or all of the front surface of the electronic device 100.

In the illustrative embodiment of FIGS. 1A-1F, and more particularly illustrated in FIG. 1A, the front surface of the electronic device 100 may include the display 110, and a partial area of the first housing 510 and a partial area of the second housing 520 that are adjacent to the display 110. The rear surface of the electronic device 100, as shown in FIG. 1F, may include the first back cover 580, a partial area of the first housing 510 that is adjacent to the first back cover 580, the second back cover 590, and a partial area of the second housing 520 that is adjacent to the second back cover 590.

The display 110 may refer to a display, at least a partial area of which is able to be deformed to be flat or curved. In an embodiment and as illustratively shown in FIG. 1A, the display 110 may include a folding area 103, a first area 101 disposed on one side with respect to the folding area 103 (on the left side of the folding area 103 illustrated in FIG. 1A), and a second area 102 disposed on an opposite side with respect to the folding area 103 (on the right side of the folding area 103 illustrated in FIG. 1A).

The division of the display 110 into the areas illustrated in FIG. 1A is an example illustration, and the display 110 may be divided into a plurality of areas (e.g., four or more areas, or two areas) depending on the structure or function of the display 110. For example, in the embodiment illustrated in FIG. 1A, the areas 101, 102 of the display 110 may be divided from each other by the folding area 103 and/or the folding axis 500_1 that extends parallel to the y-axis shown in FIGS. 1A-1F. However, in another embodiment, the display 110 may be divided into areas with respect to another folding area (e.g., a folding area parallel to the x-axis) or another folding axis (e.g., a folding axis parallel to the x-axis).

The first area 101 and the second area 102 may have symmetrical shapes with respect to the folding area 103. However, unlike the first area 101, the second area 102 may include a notch that is cut depending on the presence of the sensor area 524, and in the other areas, the second area 102 may have a shape symmetrical to the shape of the first area 101. In other words, the first area 101 and the second area 102 may include portions having mutually symmetrical shapes and portions having mutually asymmetrical shapes. According to various embodiments, when the sensor area 524 is disposed under the display 110, the first area 101 and the second area 102 may have symmetrical shapes.

Hereinafter, operations of the first housing 510 and the second housing 520 and the areas of the display 110 depending on states (e.g., a flat state (FIGS. 1A-1F) and a folded state (FIGS. 2A-2F)) of the electronic device 100 will be described.

In an embodiment, when the electronic device 100 is in a flat state (e.g., FIGS. 1A-1F), the first housing 510 and the second housing 520 may be disposed to face the same direction while forming an angle of 180 degrees. A surface of the first area 101 and a surface of the second area 102 of the display 110 may face the same direction (e.g., the direction toward the front surface of the electronic device) while forming an angle of 180 degrees. The folding area 103 may form the same plane as the first area 101 and the second area 102.

In an embodiment, when the electronic device 100 is in a folded state (e.g., FIGS. 2A-2F), the first housing 510 and the second housing 520 may be disposed to face each other. The surface of the first area 101 and the surface of the second area 102 of the display 110 may face each other while forming a narrow angle (e.g., an angle of 10 degrees or less, and even 0 degrees). At least a portion of the folding area 103, in the folded state, may be curved to have a certain curvature.

In an embodiment, when the electronic device 100 is in an intermediate state, the first housing 510 and the second housing 520 may be disposed to form a certain angle. The surface of the first area 101 and the surface of the second area 102 of the display 110 may form an angle greater than that in the folded state and smaller than that in the flat state. In the intermediate state(s), at least a portion of the folding area 103 may be curved to have a certain curvature, and at this time, the curvature may be smaller than that in the folded state. The curvature may be changeable depending on the orientation or arrangement of the first housing 510 to the second housing 520, and thus the intermediate state may encompass all angles and/or curvatures between the unfolded/flat state and the folded state.

Figure 3B:
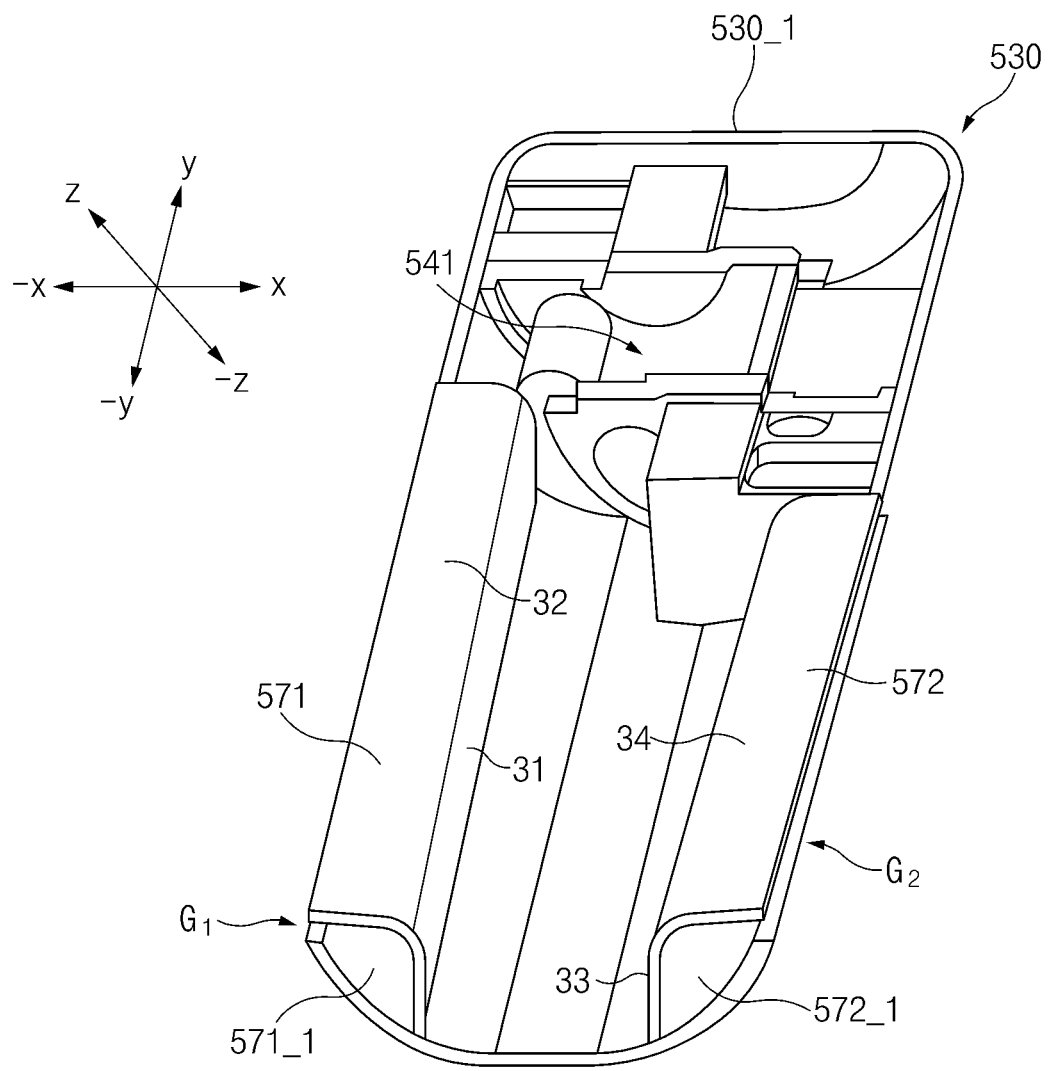
FIG. 3B is a view illustrating a portion of the hinge housing according to various embodiments.
Figure 3C:
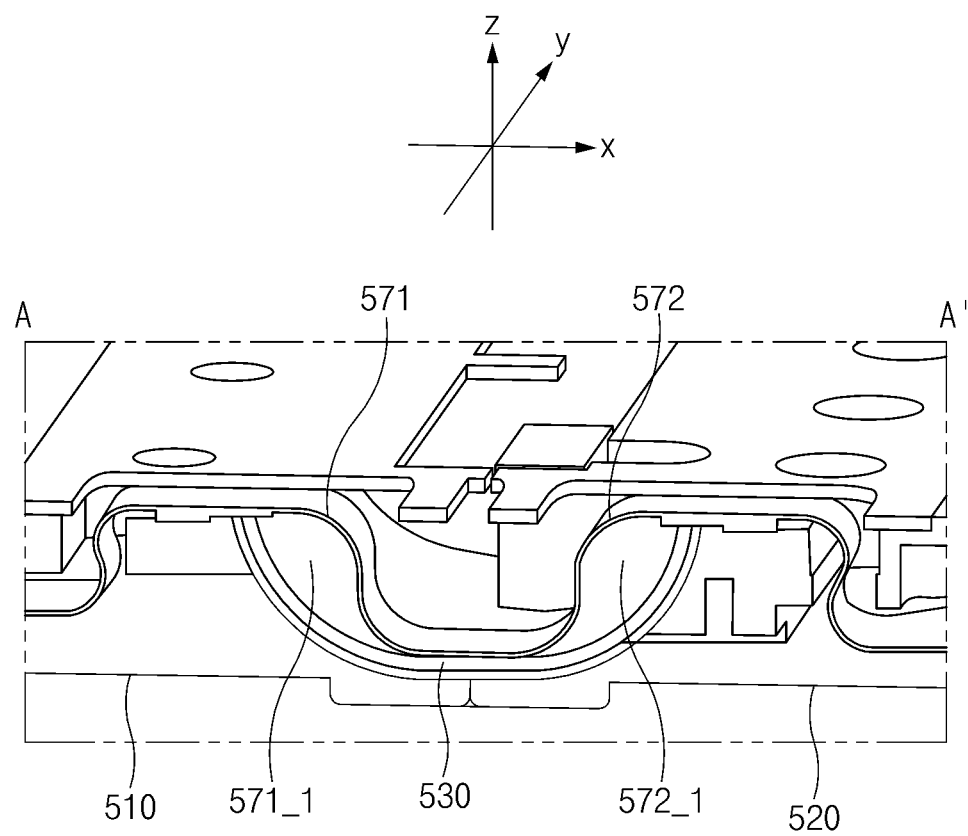
FIG. 3C is a view illustrating some components in a section taken along line A-A' of FIG. 1A.

FIG. 3A is a view illustrating one example of a cavity structure of a hinge housing according to various embodiments, FIG. 3B is a view illustrating a portion of the hinge housing according to various embodiments, and FIG. 3C is a view illustrating some components in a section taken along line A-A' of FIG. 1A.

Referring to FIG. 3A, the hinge housing 530 may be empty, and at least a portion of the inside may be open in an upper direction (the z-axis direction). According to an embodiment, at least a portion of the hinge housing 530 may be provided, for example, in the shape of a portion of a pipe or the shape of a half-pipe (here, at least a portion of a bottom surface or an outside surface of the hinge housing 530 may include a flat area rather than a curved surface). The hinge housing 530 may include sidewalls 530_1 and 530_2 that block opposite edges (e.g., the +y-axis and −y-axis edges). One or more hinge structures 541, 542, and 543 may be disposed inside the hinge housing 530. For example, the three hinge structures 541, 542, and 543 may be disposed inside the hinge housing 530. In other embodiments, the electronic device 100 of the disclosure is not limited to the number of hinge structures 541, 542, and 543, and the electronic device 100 in accordance with embodiments of the present disclosure may include more or fewer than three hinge structures. As mentioned above, the hinge housing 530 may be disposed between the first housing 510 and the second housing 520. When the electronic device 100 is in a flat state, the hinge housing 530 may be disposed under the first housing 510 and the second housing 520.

According to an embodiment, one or more cavity structures 570_1, 570_2, 570_3, 570_4, 570_5, and 570_6 may be disposed in at least partial areas other than the areas where the hinge structures 541, 542, and 543 are disposed inside the hinge housing 530. The cavity structures 570_1, 570_2, 570_3, 570_4, 570_5, and 570_6 may be disposed, for example, at opposite edges of the hinge housing 530. According to an embodiment, the one or more cavity structures 570_1, 570_2, 570_3, 570_4, 570_5, and 570_6 may be disposed between the hinge structures 541, 542, and 543.

Referring to FIG. 3B, cavity structures 571 and 572 may be disposed in partial areas other than the area where a hinge structure (e.g., hinge structure 541) is disposed inside the hinge housing 530. For example, as illustrated, the hinge housing 530 may include the first cavity structure 571 disposed to be biased toward the −x-axis edge of the hinge housing 530 and the second cavity structure 572 disposed to be biased toward the +x-axis edge of the hinge housing 530. The first cavity structure 571 and the second cavity structure 572 may be disposed such that at least portions are symmetrical to each other with respect to the y-axis. According to an embodiment, the first cavity structure 571 may include, for example, a first sidewall 31 extending upward (e.g., in the z-axis direction) from an inside bottom surface of the hinge housing 530 and a second sidewall 32 extending from an upper end of the first sidewall 31 toward the edge of the hinge housing 530. According to an embodiment, the first sidewall 31 may vertically extend from the bottom surface of the hinge housing 530 in the +z-axis direction, and the second sidewall 32 may extend from the upper end of the first sidewall 31 in the −x-axis direction at a right angle. Here, the height of the first sidewall 31 may be formed to be greater than the z-axis height of the edge of the hinge housing 530 disposed in the −x-axis direction, and thus a first gap G1 may be formed between the second sidewall 32 and the edge of the hinge housing 530 disposed in the −x-axis direction. Alternatively, at least a portion of the second sidewall 32 (e.g., an end of the second sidewall 32 in the −x-axis direction) may be spaced apart from the edge of the hinge housing 530 disposed in the −x-axis direction by a predetermined gap to form the first gap G1. The second sidewall 32 may extend in the −x-axis direction and may be formed to an area that does not exceed the edge of the hinge housing 530 in the −x-axis direction.

Similarly, the second cavity structure 572 may include a third sidewall 33 vertically extending from the inside bottom surface of the hinge housing 530 and a fourth sidewall 34 extending from an upper end of the third sidewall 33 in the +x-axis direction. A second gap G2 may be formed between a portion of the fourth sidewall 34 (e.g., the +x-axis edge of the fourth sidewall 34) and the edge of the hinge housing 530 in the +x-axis direction. The first gap G1 and the second gap G2 may serve as passages through which foreign matter enters and exits. A first cavity 571_1 and a second cavity 571_2 may be formed depending on the arrangement of the first cavity structure 571 and the second cavity structure 572 relative to the hinge housing 530. The first cavity 571_1 and the second cavity 571_2 may be used as spaces in which foreign matter introduced through the first gap G1 and the second gap G2 is accumulated.

The structure illustrated in FIG. 3C exemplifies a structure in which some components, such as the display and a support plate, are excluded from the section taken along line A-A' of FIG. 1A. Referring to FIG. 3C, the first housing 510 and the second housing 520 may be disposed side by side in the x-axis direction depending on a flat state. The display 110 may be disposed on an upper surface (e.g., the surfaces facing the +z-axis direction) of the first housing 510 and the second housing 520, and the support plate may be additionally disposed between the display 110 and the first and second housings 510 and 520. While the first housing 510 and the second housing 520 are disposed in the flat state, the hinge housing 530 may be disposed under the first housing 510 and the second housing 520 and may be disposed such that the outside of the hinge housing 530 is hidden by one edge of the first housing 510 and one edge of the second housing 520. As described above, inside the hinge housing 530, the first cavity structure 571 and the second cavity structure 572 may be disposed, and the first cavity 571_1 and the second cavity 572_1 defined by the first cavity structure 571 and the second cavity structure 572 may be disposed. Opposite edges of each of the first cavity structure 571 and the second cavity structure 572 in the +y-axis direction and the −y-axis direction may be closed, and thus at least a portion of foreign matter (e.g., dust, dirt, particulate matter, etc.) introduced through the first gap G1 and the second gap G2 may remain only in the respective first cavity 571_1 and second cavity 571_2. Accordingly, a movement of the foreign matter may be suppressed such that the foreign matter fails to move directly below the display, and thus damage to the display may be prevented.

Figure 4A:
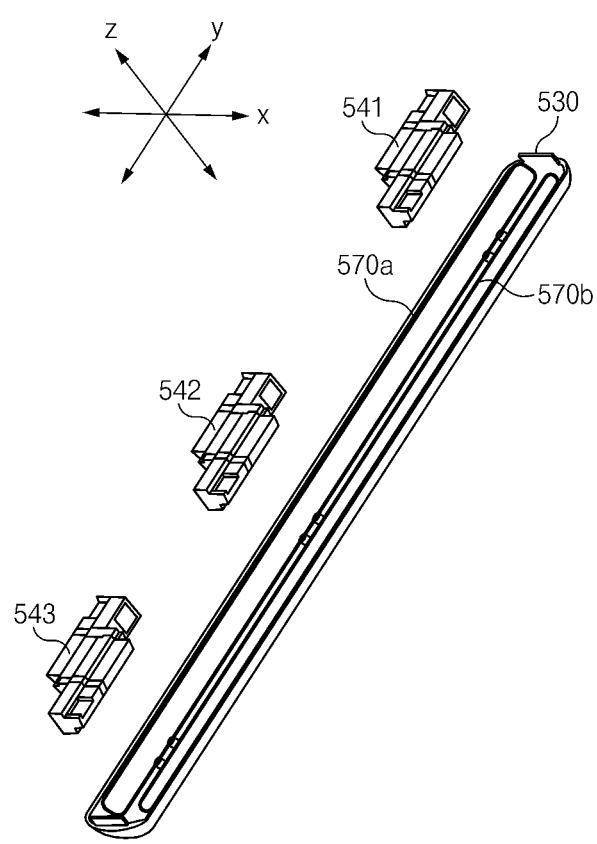
FIG. 4A is a view illustrating another example of the cavity structure formed in the hinge housing according to various embodiments.
Figure 4B:
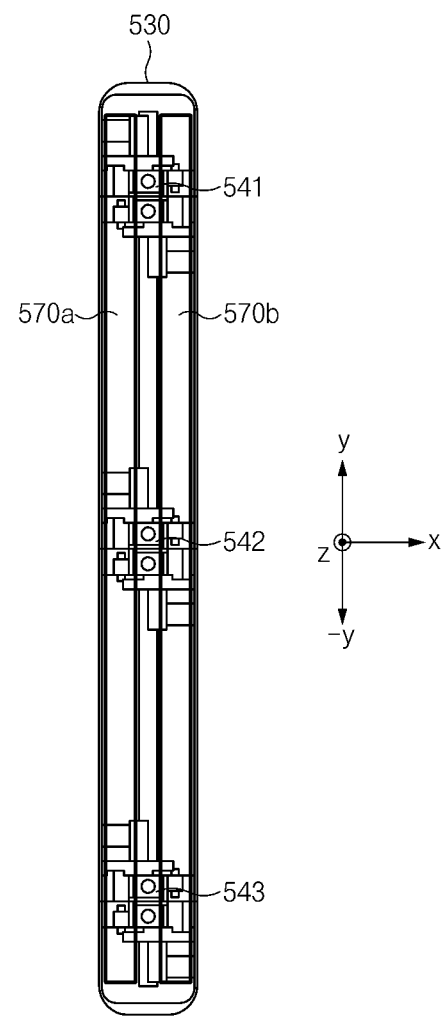
FIG. 4B illustrates an elevation view of the embodiment of FIG. 4A as assembled.

FIGS. 4A-4B illustrate another example of a cavity structure formed in a hinge housing according to various embodiments.

Referring to FIGS. 4A-4B, a third cavity structure 570*a* and a fourth cavity structure 570*b* may be disposed inside a hinge housing 530. For example, the third cavity structure 570*a* may be disposed inside the hinge housing 530 and may be disposed to be biased in the −x-axis direction, and may be continuously disposed from the +y-axis edge to the −y-axis edge of the hinge housing 530. The fourth cavity structure 570*b* may be disposed inside the hinge housing 530 and may be disposed to be biased in the +x-axis direction, and may be continuously disposed from the +y-axis edge to the −y-axis edge of the hinge housing 530. The third cavity structure 570a and the fourth cavity structure 570b may be disposed to be spaced apart from each other by a predetermined gap inside the hinge housing 530. According to various embodiments, at least some of the areas of the third cavity structure 570a that overlap hinge structures 541, 542, and 543 may differ from other adjacent areas. For example, the sizes of cavities in the areas vertically overlapping the hinge structures 541, 542, and 543 in the +z-axis direction may be formed to be smaller or narrower than the sizes of cavities in the areas where the hinge structures 541, 542, and 543 are not disposed.

Figure 5A:
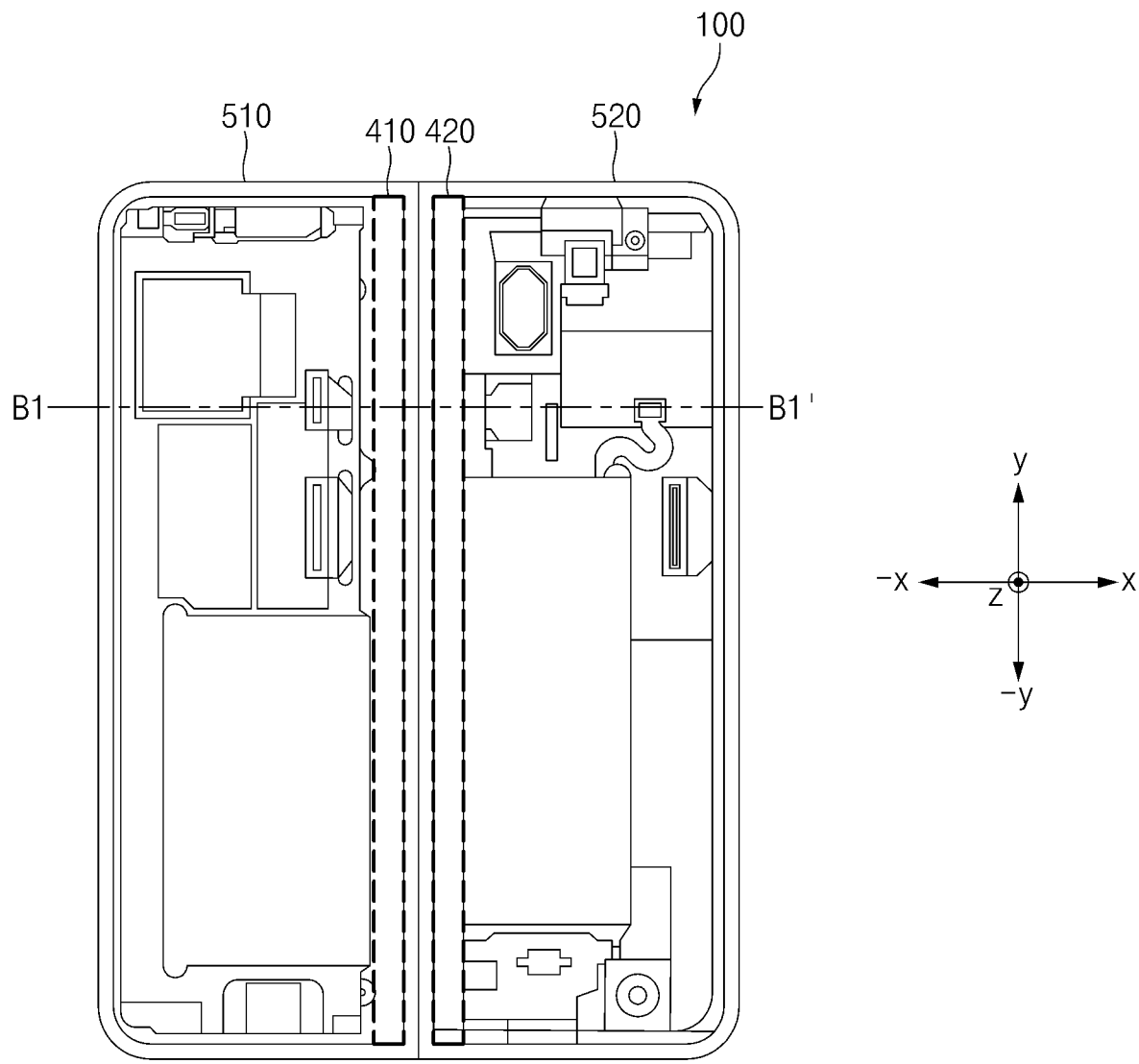
FIG. 5A is a view illustrating one example of a partial configuration related to a sealing structure of the electronic device according to various embodiments.
Figure 5B:
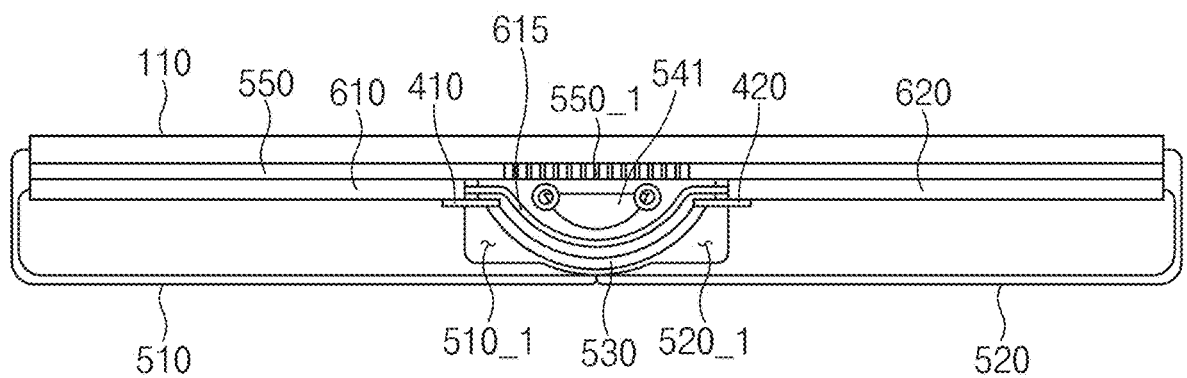
FIG. 5B is a view illustrating one example of a section taken along line B1-B1' of FIG. 5A.
Figure 5C:
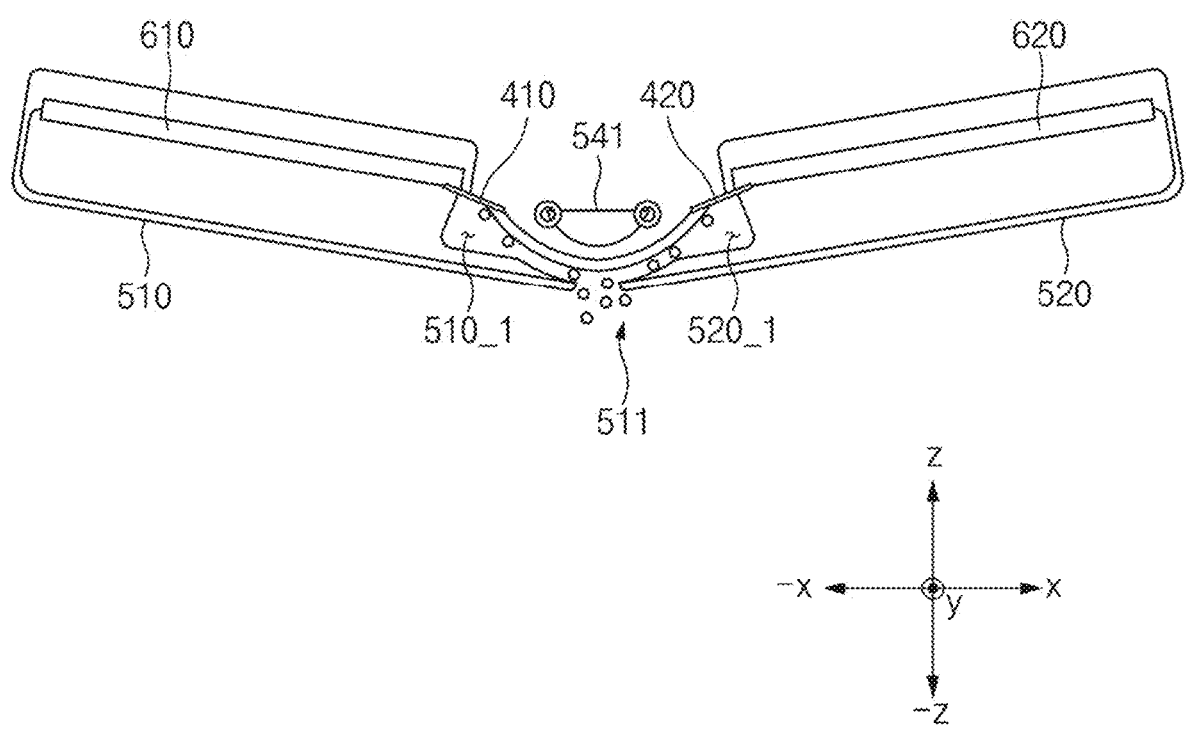
FIG. 5C is a view illustrating one example of a form in which some components are excluded from the section taken along line B-B' of FIG. 5A.

FIG. 5A is a view illustrating one example of a partial configuration related to a sealing structure of the electronic device 100 according to various embodiments, and FIG. 5B is a view illustrating one example of a section taken along line B1-B1' of FIG. 5A. FIG. 5C is a view illustrating one example of a form in which some components are excluded from the section taken along line B-B' of FIG. 5A. The structure of the electronic device 100 illustrated in FIG. 5A may be a view illustrating a shape in which the display 110 and at least one support plate that may be disposed under the display 110 are removed. FIG. 5B is a view illustrating a state in which the display 110 and a support plate 550 are stacked on one side surface of the electronic device 100 (e.g., the section taken along line B1-B1').

Referring to FIGS. 5A-5C, the electronic device 100 may include the display 110, the support plate 550 (e.g., a metal plate or other supporting structure) disposed under the display 110, and circuit boards 610 and 620 disposed under the support plate 550. The electronic device 100 may include the first housing 510 and the second housing 520 in which at least portions of the display 110, the support plate 550, and the circuit boards 610 and 620 are seated. The electronic device 100, as shown, includes the hinge housing 530, at least a portion of which is disposed between the first housing 510 and the second housing 520. At least a portion of the display 110 may include a flexible display area such that a central portion is curved or bendable from a flat state to a curved state. The support plate 550 may be disposed under the display 110 and may ensure the flatness of the display 110. To support a folded state of the electronic device 100, the support plate 550 may include a foldable area 541 (e.g., a lattice area) in a central portion thereof.

The circuit boards 610 and 620 may include, for example, the first circuit board 610 disposed in the first housing 510, the second circuit board 620 disposed in the second housing 520, and a flexible circuit board 615 connecting at least portions of the first circuit board 610 and the second circuit board 620. At least a portion of the flexible circuit board 615 may be disposed inside the hinge housing 530.

In a flat state shown in FIG. 5B, the electronic device 100 may be disposed such that one edge (e.g., the +x-axis edge) of the first housing 510 and one edge (e.g., the −x-axis edge) of the second housing 520 face each other. In the flat state, the hinge housing 530 described above may be hidden by the first housing 510 and the second housing 520.

As shown in FIG. 5A a first sealing member 410 and a second sealing member 420 may be disposed on upper portions (e.g., portions in the +z-axis direction) of the first housing 510 and the second housing 520 in the area in which the hinge housing 530 is disposed. For example, the first sealing member 410 may be disposed on one side of the first housing 510 and may be disposed at an edge of the first housing 510 that corresponds to the upper side of the −x-axis edge of the hinge housing 530. The first sealing member 410 may be disposed to extend in the +y-axis and −y-axis directions illustrated in FIG. 5A. At least a portion of the first sealing member 410 may serve to block a gap between a third cavity 510_1 formed in the first housing 510 and the hinge housing 530, as shown in FIG. 5B. Accordingly, the first sealing member 410 may be disposed to cover at least a portion of the +x-axis edge of the first housing 510 and at least a portion of the −x-axis edge of the hinge housing 530.

Similarly, the second sealing member 420 may be disposed at the −x-axis edge of the second housing 520 that corresponds to the upper side of the +x-axis edge of the hinge housing 530. The second sealing member 420 may extend in the +y-axis and −y-axis directions and may be disposed side by side with the first sealing member 410 with a predetermined gap therebetween. At least a portion of the second sealing member 420 may serve to block a gap between a fourth cavity 520_1 formed in the second housing 520 and the hinge housing 530, as shown in FIG. 5B. Accordingly, the second sealing member 420 may be disposed to cover at least a portion of the −x-axis edge of the second housing 520 and at least a portion of the +x-axis edge of the hinge housing 530.

In accordance with some embodiments, the first and second sealing members 410, 420 may be attached to or bonded to the respective first and second housings 510, 520 and/or hinge housing 530. According to various embodiments, the first sealing member 410 and/or the second sealing member 420 may have an adhesive material partially applied thereto, or may have an adhesive material applied to the entire surface thereof that faces the −z-axis direction.

The first sealing member 410 and the second sealing member 420 may prevent foreign matter introduced from the outside from infiltrating below the display 110 through the gap between the first housing 510 and/or the second housing 520 and the hinge housing 530. FIG. 5C illustrates the first housing 510 separated from the second housing 520 in a transition between a flat or unfolded state and a folded state (e.g., an intermediate state). As shown, foreign matter 511 may be expelled from the cavities 510_1, 520_1, in this state.

Figure 5D:
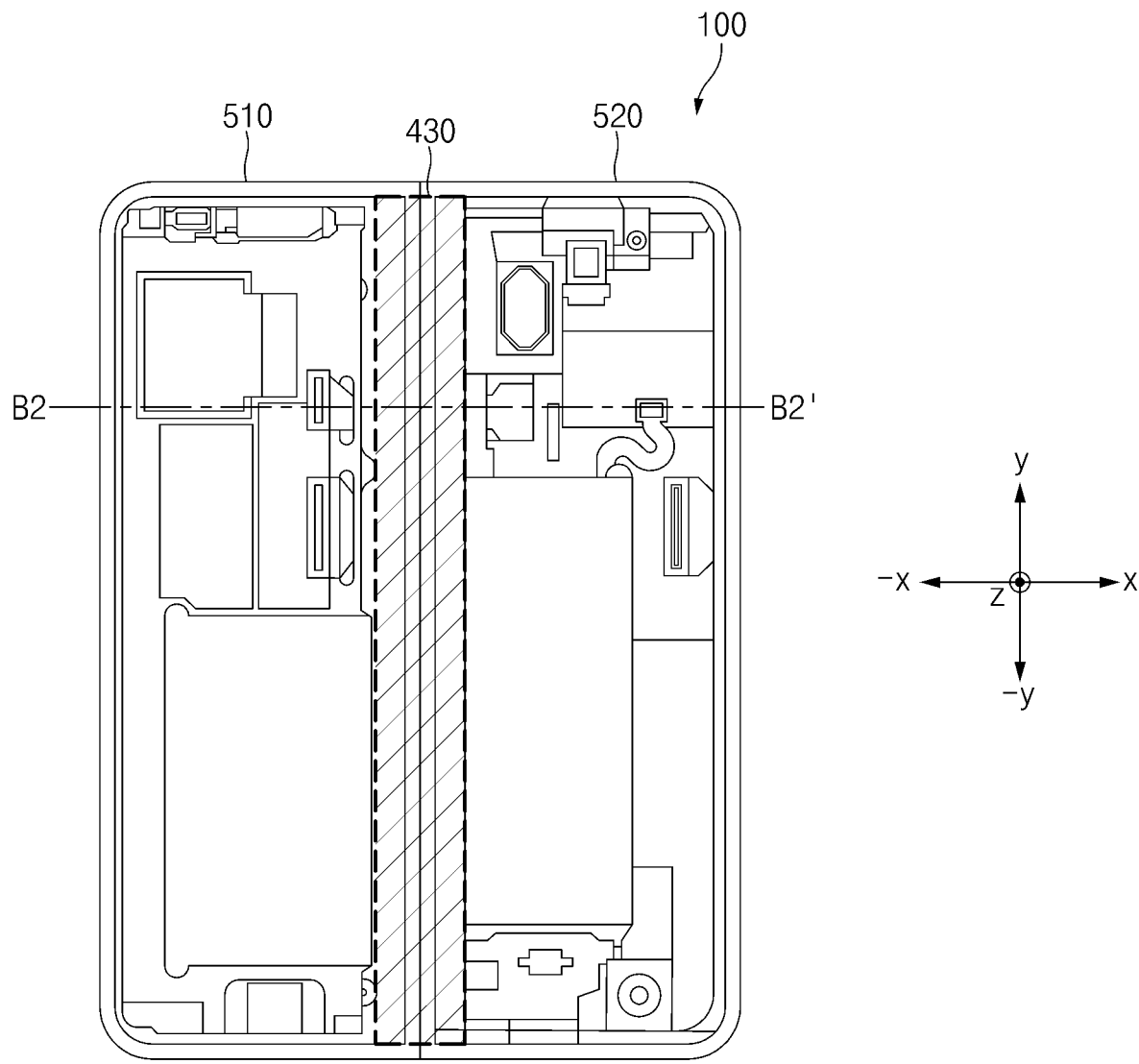
FIG. 5D is a view illustrating another example of the partial configuration related to the sealing structure of the electronic device according to various embodiments.
Figure 5E:
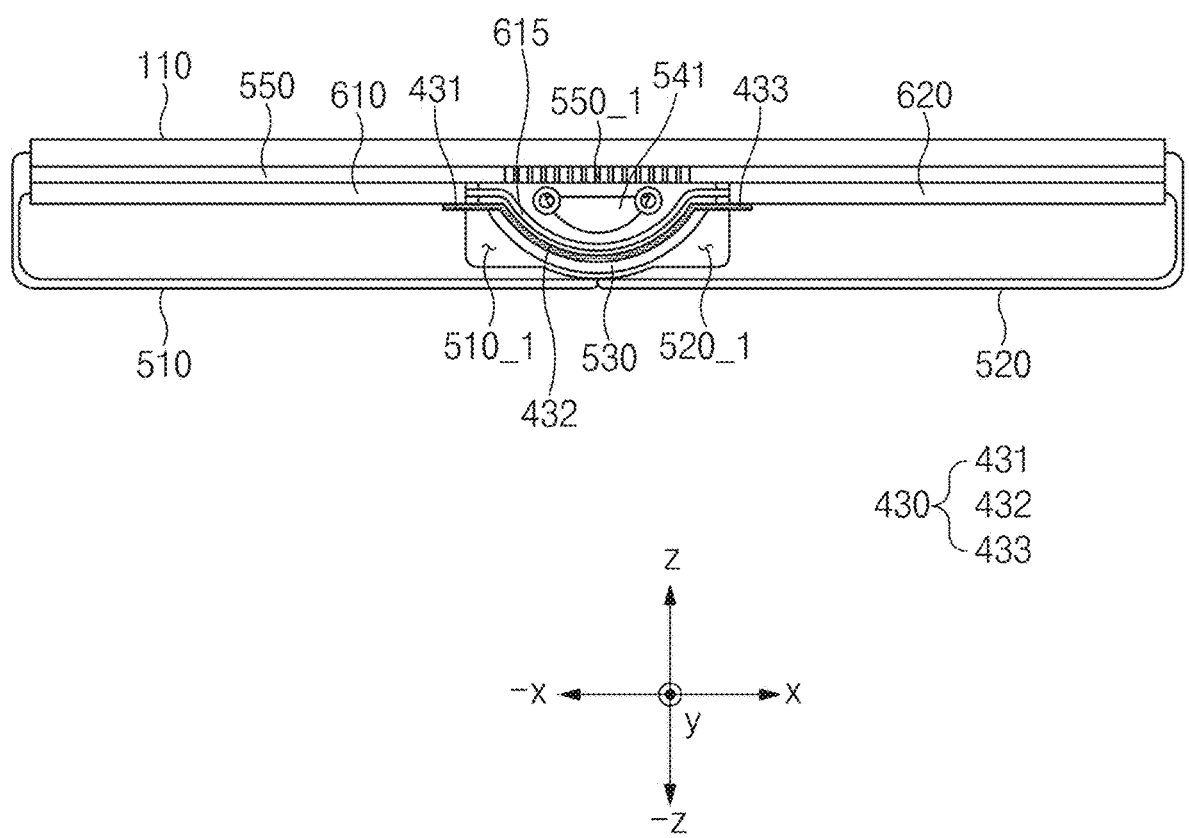
FIG. 5E is a view illustrating one example of a section taken along line B2-B2' of FIG. 5D.
Figure 5F:
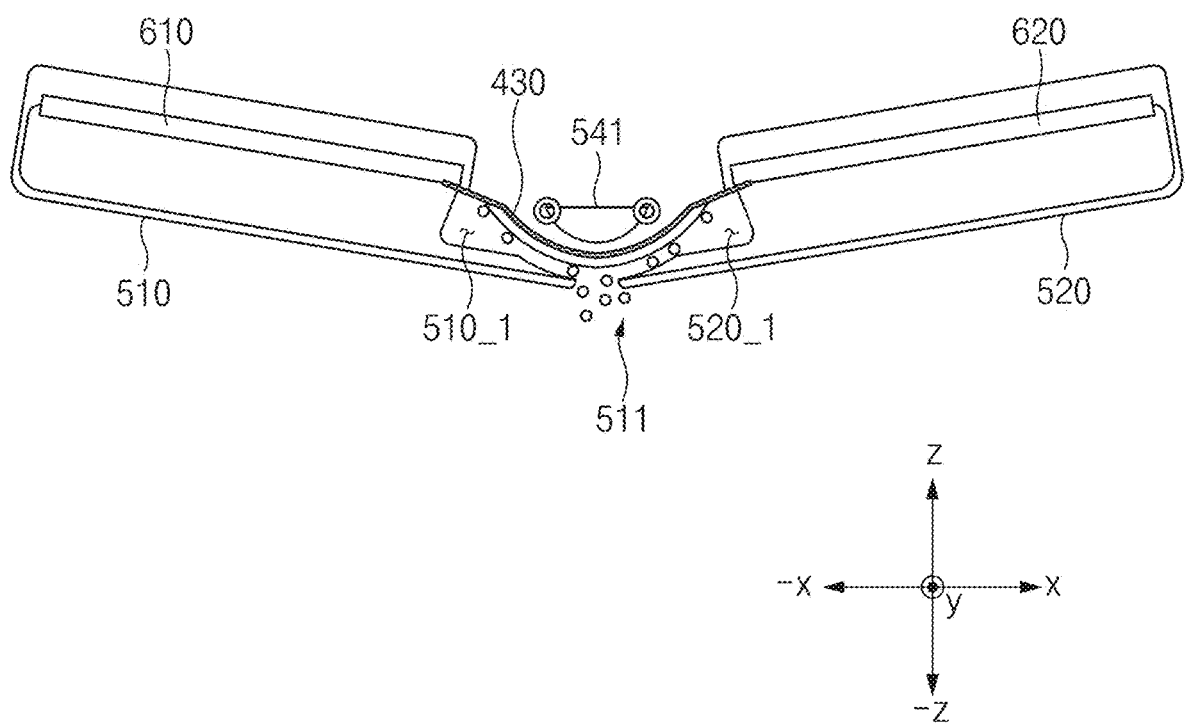
FIG. 5F is a view illustrating one example of a form in which some components are excluded from the section taken along line B2-B2' of FIG. 5D.

FIG. 5D is a view illustrating another example of the partial configuration related to the sealing structure of the electronic device according to various embodiments, and FIG. 5E is a view illustrating one example of a section taken along line B2-B2' of FIG. 5D. FIG. 5F is a view illustrating one example of a form in which some components are excluded from the section taken along line B2-B2' of FIG. 5D.

Referring to FIGS. 5D-5F, the electronic device 100 may include a display 110, a support plate 550 (or, a metal plate or other support structure) disposed under the display 110, and circuit boards 610 and 620 disposed under the support plate 550. The electronic device 100 shown in FIGS. 5D-5F may include a first housing 510 and a second housing 520, as described above, in which at least portions of the display 110, the support plate 550, and the circuit boards 610 and 620 are seated. A hinge housing 530 is disposed between the first housing 510 and the second housing 520. In this embodiment, the electronic device 100 includes a third sealing member 430. Compared with the electronic device described above with reference to FIGS. 5A-5C, the electronic device 100 of FIGS. 5D-5F may include the same configuration and form except for the form, arrangement, and position of the sealing member 430. For example, at least a portion of the support plate 550 may be disposed under the display 110 to ensure the flatness of the display 110 and may include a foldable area 541 (e.g., a lattice area) in the central portion in relation to supporting a folded state of the electronic device 100.

As shown, the third sealing member 430 may be disposed to cover at least a portion of one edge (e.g., the +x-axis edge) of the first housing 510, at least a portion of one edge (e.g., the −x-axis edge) of the second housing 520, and the upper surface of the hinge housing 530. The third sealing member 430 may include, for example, a first sealing part 431 disposed on one edge of the first housing 510, a second sealing part 432 disposed on one edge of the second housing 520, and a third sealing part 433 disposed inside the hinge housing 530 between the first sealing part 431 and the second sealing part 432. In some embodiments, the first sealing part 431, the second sealing part 432, and the third sealing part 433 form a single unitary or continuous sealing body. The +x-axis edge of the first sealing part 431 may extend or join with the −x-axis edge of the third sealing part 433, and the +x-axis edge of the third sealing part 433 may extend or join with the −x-axis edge of the second sealing part 431. The third sealing part 433 may be curved and disposed to face at least a portion of the inside bottom surface of the hinge housing 530. As the third sealing member 433 is continuously disposed between the first housing 510 and the hinge housing 530 and between the hinge housing 530 and the second housing 520, the electronic device 100 of the disclosure that has the above-described structure may exhibit characteristics robust to a change in mechanical parts (e.g., a change in the positions of the first housing 510 and the second housing 520) that occurs in a folding or unfolding operation process of the electronic device 100 and may more firmly prevent infiltration of foreign matter 511.

Figure 6A:
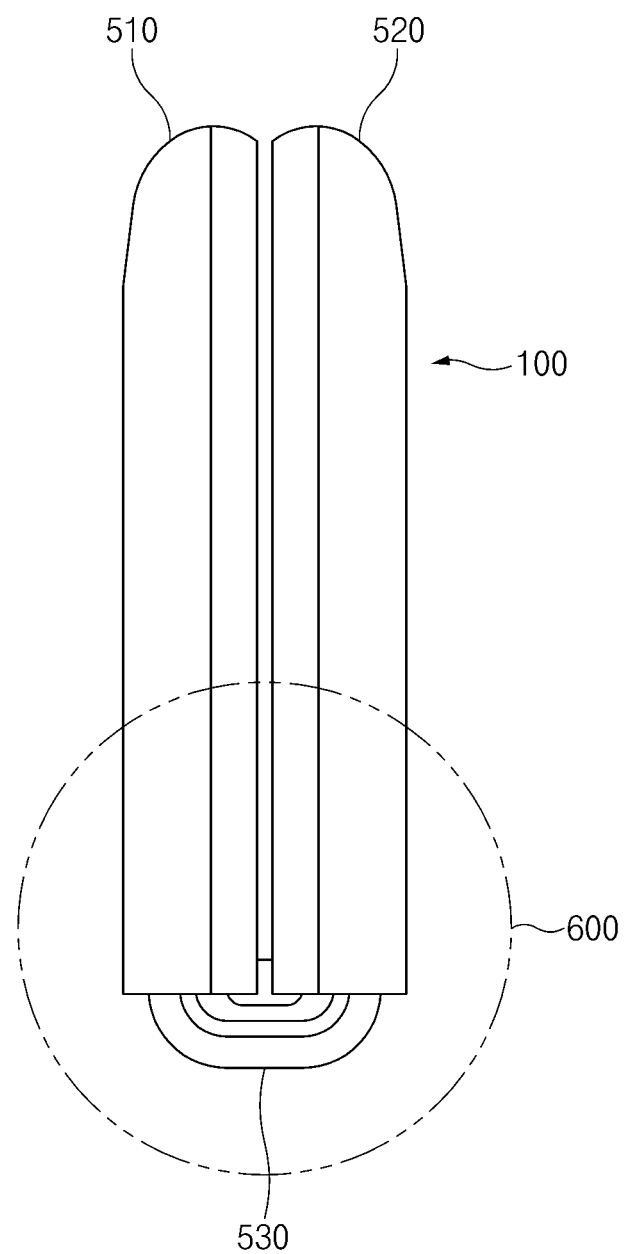
FIG. 6A is a view illustrating one example of a folded state of an electronic device having a foreign matter infiltration prevention structure according to various embodiments.
Figure 6B:
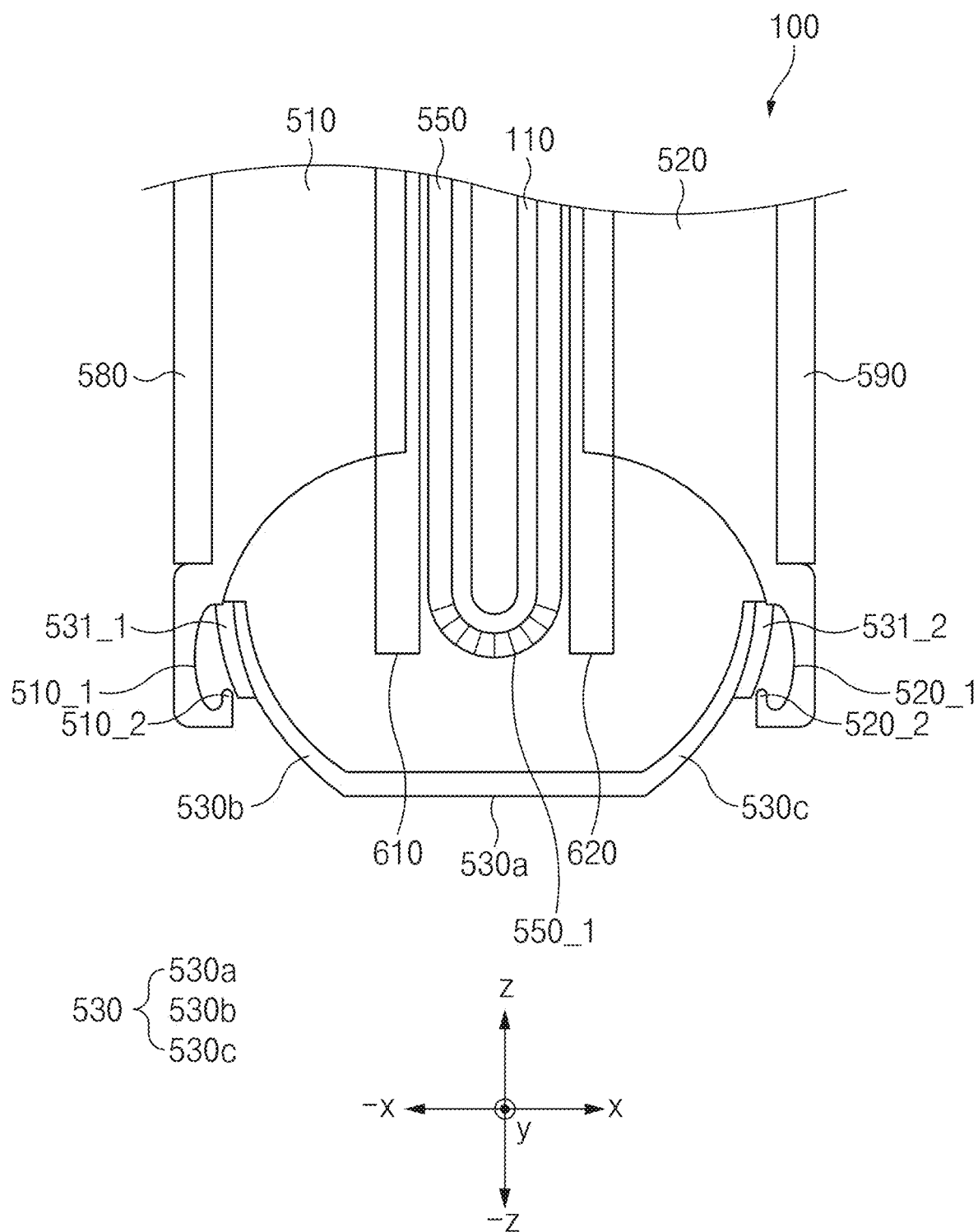
FIG. 6B is a view illustrating one example of a section of an area 600 of FIG. 6A.

FIG. 6A is a view illustrating one example of a folded state of the electronic device 100 having a foreign matter infiltration prevention structure according to various embodiments, and FIG. 6B is a view illustrating one example of a section of an area 600 of the electronic device 100 of FIG. 6A.

Referring to FIGS. 6A-6B, the electronic device 100 according to an embodiment may include the first housing 510, the second housing 520, and the hinge structure 530. In addition, the electronic device 100 may include a first back cover 580 disposed on a rear surface of the first housing 510, a second back cover 590 disposed on the rear surface of the second housing 520, the display 110 disposed on the first housing 510 and the second housing 520 and at least partially located between the first housing 510 and the second housing 520 in a folded state (e.g., as shown in FIG. 6B), the support plate 550 disposed under the display 110, and the first circuit board 610 and the second circuit board 620 disposed under the support plate 550. At least a portion of the support plate 550 may be disposed to be spaced apart from the display 110, or at least a portion of the support plate 550 may be attached with the display 110. For example, an adhesive member may be disposed between at least a partial surface of the remaining area other than a central portion 550_1 (e.g., a lattice area) of the support plate 550 and the display 110. For example, the first circuit board 610 and the second circuit board 620 may be disposed on the first housing 510 and the second housing 520.

In a folded state of the electronic device 100, the third cavity 510_1 described above with reference to FIG. 5B may be formed at an edge (e.g., the −z-axis edge) of the first housing 510. The third cavity 510_1 may be recessed relative to a surrounding area and may be formed to be long in the y-axis direction of the first housing 510. The fourth cavity 520_1 described above with reference to FIG. 5B may be formed at an edge (e.g., the −z-axis edge) of the second housing 520. The fourth cavity 520_1 may be recessed relative to a surrounding area and may be formed to be long in the y-axis direction of the second housing 520. The third cavity 510_1 and the fourth cavity 520_1 may be disposed such that at least portions face each other in a flat state of the electronic device 100. Peripheral portions 510_2, 520_2 (e.g., the −z-axis ends) that form the third cavity 510_1 and the fourth cavity 520_1 may be formed such that at least portions protrude in the z-axis direction and thus may be formed to minimize gaps with the hinge housing 530 and guide members 531_1 and 531_2 formed on the hinge housing 530 and allow introduced foreign matter to be easily loaded in the cavities 510_1 and 520_1.

The hinge housing 530 may include, for example, a bottom portion 530a, a first curved side portion 530b that is formed at the −x-axis edge of the bottom portion 530a and that has a certain curvature, and a second curved side portion 530c that is formed at the +x-axis edge of the bottom portion 530a and that has a certain curvature. As shown, the bottom portion 530a may have at least a portion or extend in the a-axis direction that is formed to be flat or non-curved. It will be appreciated that a continuously curved bottom portion may be employed without departing from the scope of the present disclosure. The first curved side portion 530b and the second curved side portion 530c may be disposed to be symmetrical to each other based on the bottom portion 530a and the y-axis direction. For example, the first curved side portion 530b may be formed such that at least a portion is convex in the −x-axis direction with respect to a center of the bottom portion 530a. Similarly, the second curved side portion 530c may be formed such that at least a portion is convex in the +x-axis direction with respect to the center of the bottom portion 530a.

The first guide member 531_1 may be disposed on an outer surface (e.g., a surface facing the −x-axis direction) of the first curved side portion 530b. In some non-limiting embodiments, the first guide member 531_1 may include a fiber member (e.g., Teflon or mohair) that protrudes from the outer surface of the first curved side portion 530b and has a predetermined length. The first guide member 531_1 may be formed to be long in the y-axis direction of the first curved side portion 530b. Alternatively, the first guide member 531_1 may be formed to have a length corresponding to the third cavity 510_1 formed to be long in the y-axis direction. When the first guide member 531_1 is a fiber structure (e.g., Teflon), the width of the first guide member 531_1 may be formed to be greater than or equal to the width of the third cavity 510_1. However, the −z-axis end of the first housing 510 that forms the third cavity 510_1 in the z-axis direction may be disposed below the first guide member 531_1 in the −z-axis direction. Accordingly, when observed from outside the electronic device 100 in the −x-axis direction, the first guide member 531_1 may be disposed so as not to be visible by being hidden by the first housing 510 of the electronic device 100. According to various embodiments, the first guide member 531_1 may include at least one guide pattern formed on the outer surface of the first curved side portion 530b. The at least one guide pattern may guide foreign matter introduced along a surface of the hinge housing 530 into the third cavity 510_1.

The second guide member 531_2 may be disposed on an outer surface (e.g., a surface facing the +x-axis direction) of the second curved side portion 530c. Similarly to the first guide member 531_1, the second guide member 5312_2 may be formed of a fiber member protruding from the outer surface of the second curved side portion 530c and having a predetermined length, or may include at least one guide pattern (e.g., a comb pattern) that is formed on at least a portion of the outer surface. The second guide member 531_2 may have a width similar to that of the fourth cavity 520_1 or a width smaller than that of the fourth cavity 520_1. The second guide member 531_2 may be disposed to be symmetrical to the first guide member 531_1 based on the z-axis in a folded state of the electronic device 100 and may support a function that is the same as or similar to the function of the first guide member 531_1.

Figure 7:
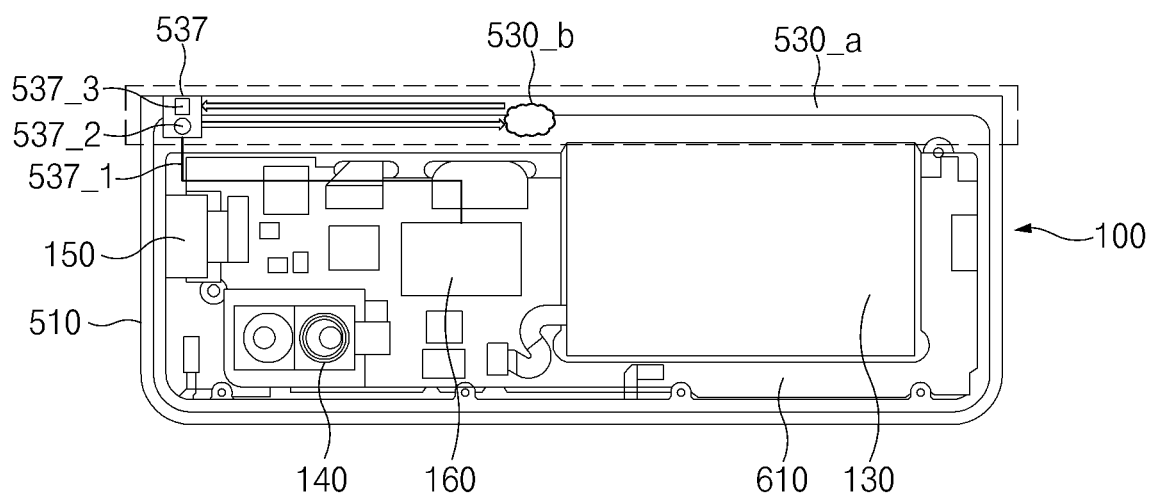
FIG. 7 is a view illustrating one example of a partial configuration of an electronic device having a foreign matter detection structure according to various embodiments.

FIG. 7 is a view illustrating one example of a partial configuration of the electronic device 100 having a foreign matter detection structure according to various embodiments. One surface of the electronic device 100 illustrated represents a surface facing the first housing 510 in a folded state.

Referring to FIG. 7, at least a portion of the electronic device 100 according to an embodiment may include the first housing 510, the first circuit board 610, a battery 130, a hinge area 530_a, and a foreign matter detection sensor 537. As shown in FIG. 7, foreign matter 530_b may be located within the hinge area 530_a. A processor 160, a first camera 140, and a second camera 150 may be mounted on the first circuit board 610. Additionally, at least a portion of a wire 537_1 electrically connecting the processor 160 and the foreign matter detection sensor 537 may be disposed on the first circuit board 610.

The hinge area 530_a may include cavity areas disposed in the hinge housing 530 or the first housing 510. According to an embodiment, the hinge area 530_a may include the third cavity 510_1 disposed in the first housing 510.

The foreign matter detection sensor 537 may detect the foreign matter 530_b accumulated in the hinge area 530_a (e.g., foreign matter in third cavity 510_1, described above). For example, the foreign matter detection sensor 537 may detect the degree of accumulation of foreign matter 530_b by transmitting specified signals like an ultrasonic sensor or an infrared sensor (e.g., a transmitter) and collecting signals reflected by the foreign matter 530_b among the transmitted signals (e.g., a receiver). For example, the foreign matter detection sensor 537 may detect the degree of accumulation of foreign matter 530_b, based on an intensity of a transmitted signal, the amount of light, a change in a time delay, whether a signal is interrupted, or the like. In the illustrated drawing, it is exemplified that the foreign matter detection sensor 537 has a structure in which a signal transmitter 537_2 and a signal receiver 537_3 are disposed adjacent to each other. However, embodiment of the present disclosure are not limited to this specific configuration of the foreign matter detection sensor 537. For example, the signal transmitter of the foreign matter detection sensor 537 may be disposed at one edge of the hinge area 530_a, and the signal receiver may be disposed at an opposite edge of the hinge area 530_a.

According to various embodiments, a foreign matter detection sensor 537 may be disposed in a fourth cavity 520_1 disposed on one side of the second housing 520 (e.g., similar to that shown in FIG. 6B). Alternatively, the foreign matter detection sensor 537 may be disposed in at least one of the first cavity structure 571, the second cavity structure 572, the third cavity structure 570a, or the fourth cavity structure 570b, shown and described above. Further, in some embodiments, multiple foreign matter detection sensors may be provided, for each cavity or area to be monitored for foreign matter detection.

The foreign matter detection sensor 537 may be configured to collect sensing information about a foreign matter accumulation state based on a predetermined schedule at time intervals, based on particular states/operations of the electronic device 100, or the like. The foreign matter detection sensor 537 may transfer the sensing information to the processor 160. According to various embodiments, the foreign matter detection sensor 537 may collect the sensing information about the foreign matter accumulation state (e.g., accumulation of foreign matter 530_b) when the electronic device 100 is changed from a folded state to a flat state, or vice versa. Alternatively, the foreign matter detection sensor 537 may collect the sensing information about the foreign matter accumulation state when the electronic device 100 is inserted into a docking system for wireless charging or a dock for removal of foreign matter. In still further configurations, the foreign matter detection sensor 537 may be configured to sense for foreign matter accumulation based on a preset or predetermined schedule or interval, independent of the operational state of the electronic device 100.

According to various embodiments, under the control of the processor 160, the foreign matter detection sensor 537 may collect sensing information when a drop event with a high possibility of infiltration of foreign matter into the electronic device 100 is sensed. In this regard, the electronic device 100 may include an acceleration sensor, and when acceleration sensing information corresponding to a drop of the electronic device 100 at a specified minimum height or more is sensed while the acceleration sensor is executed in real time (or, periodically or always), the processor 160 may activate the foreign matter detection sensor 537 and may collect sensing information about a foreign matter accumulation state (or, the size of foreign matter). In this operation, the processor 160 may collect the sensing information about the foreign matter accumulation state (or, the size of the foreign matter) after specified time (e.g., 10 sec or 1 min) from the drop of the electronic device. Based on the above-described operation, the electronic device 100 may perform an operation related to detection of foreign matter only when a specific event (e.g., a drop event or a specific interrupt) occurs, thereby providing an effect of reducing power and/or processing consumption, as compared with when detection is always performed.

The processor 160 may control operation of the foreign matter detection sensor 537. For example, in response to a predetermined period or a specific event (e.g., when the electronic device 100 is folded or unfolded, connected with an external device, dropped, enters a charging state, or the like), the processor 160 may control operation of the foreign matter detection sensor 537 and may collect sensing information. The processor 160 may detect the amount of accumulated foreign matter based on the sensing information and may inform of the detected amount of accumulated foreign matter through the display 110 or a speaker connected to an audio processing unit of the electronic device 100. According to various embodiments, when the amount of accumulated foreign matter is greater than or equal to a specified magnitude (e.g., 70%), the processor 160 may inform of the amount of accumulated foreign matter through the display 110 or the speaker. In some embodiments, the specified magnitude may be a percentage of volume occupied by the foreign matter. In some embodiments, the specified magnitude may be based on a signal strength or level detected at a received that is impacted by the amount of foreign matter in the hinge area.

Figure 8A:
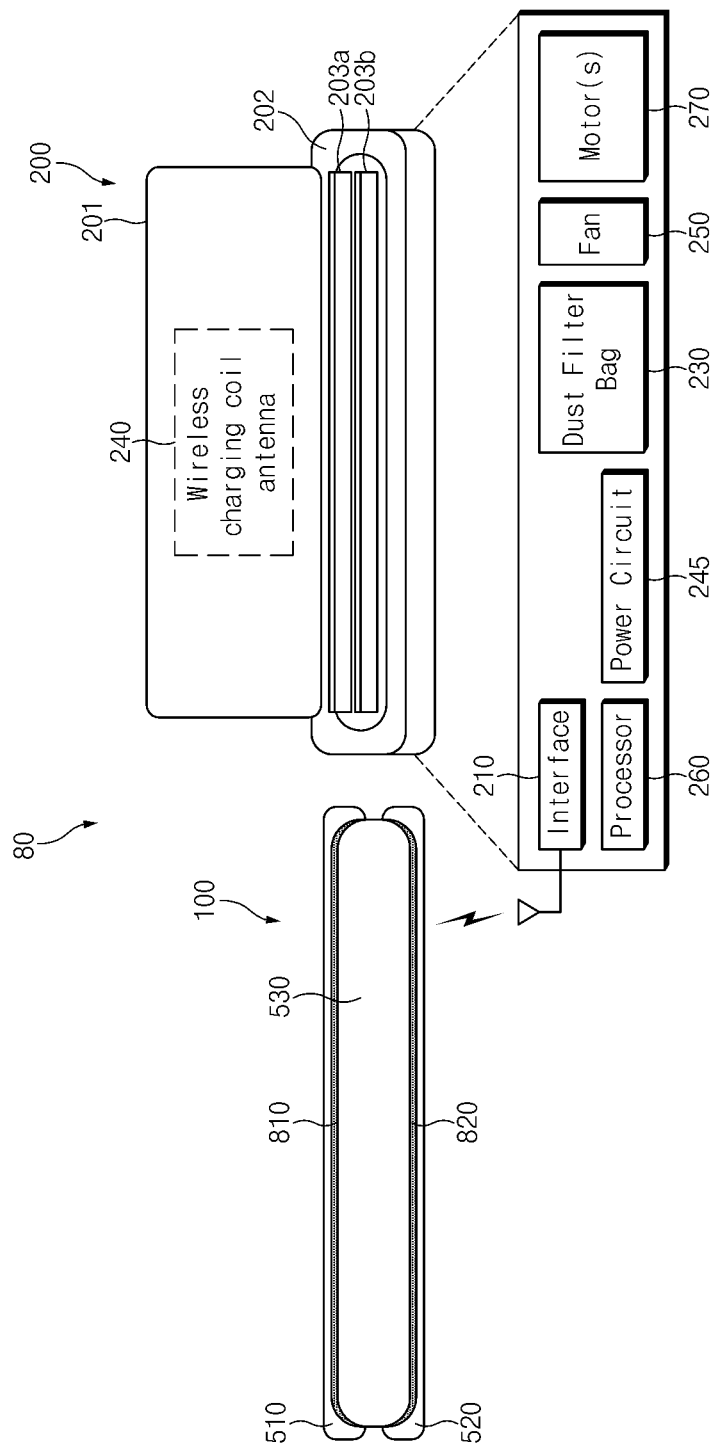
FIG. 8A is a view illustrating one example of a foreign matter removal system according to various embodiments.

FIG. 8A is a view illustrating one example of a foreign matter removal system according to various embodiments.

Referring to FIG. 8A, a foreign matter removal system 80 according to an embodiment may include the electronic device 100 and a foreign matter removal device 200.

As mentioned above, the electronic device 100 may include a first housing 510, a second housing 520, and a hinge housing 530. While the first housing 510 and the second housing 520 are disposed to face each other in a folded state (as shown in FIG. 8A), a first housing air passage 810 (e.g., 0.1 mm to 0.3 mm) between the first housing 510 and the hinge housing 530 and a second housing air passage 820 between the second housing 520 and the hinge housing 530 may be formed. When foreign matter infiltrates into the electronic device 100 through the first housing air passage 810 and the second housing air passage 820, the foreign matter may be accumulated in at least one cavity (e.g., cavities described above with reference to FIGS. 3-6B). The electronic device 100 may include at least one communication circuit capable of communication with the foreign matter removal device 200. For example, the electronic device 100 may include a USB connector wiredly connected with the foreign matter removal device 200 and/or a short-range wireless communication circuit (e.g., Bluetooth, ZigBee, wireless LAN (Wi-Fi), UWB, or NFC) that wirelessly establishes a communication channel between the electronic device 100 and the foreign matter removal device 200. The electronic device 100 may detect infiltration of foreign matter or the amount of accumulated foreign matter by using a foreign matter detection sensor (e.g., foreign matter detection sensor 537 described with reference to FIG. 7). The electronic device 100 may provide, to the foreign matter removal device 200, information related to foreign matter detected depending on occurrence of an event or based on a schedule or the like.

The foreign matter removal device 200 may include a mounting part 201 configured to support the electronic device 100 and a main body 202 supporting the mounting part 201. The mounting part 201 may be brought into contact with one surface (e.g., at least a portion of the rear surface) of the electronic device 100 seated thereon, or may be disposed to be spaced apart from the one surface of the electronic device 100 with a predetermined gap therebetween. The mounting part 201 may include a wireless charging coil 240 (or, a wireless charging coil antenna) and a mounting part case in which the wireless charging coil 240 is mounted. One side of the mounting part 201 may be connected or fixed to the main body 202. The main body 202 may include an interface circuit 210, a processor 260, a charging or power circuit 245, a foreign matter filter 230 (e.g., filter bag or the like), a fan 250, one or more motors 270, a first suction unit 203a, and a second suction unit 203b. In addition, the main body 202 may include a main body case in which the interface circuit 210, the processor 260, the charging circuit 245, the foreign matter filter 230, the fan 250, and the motor 270 are mounted. A fixing area to which the mounting part case is fixed and an arrangement area in which the first suction unit 203a and the second suction unit 203b are disposed may be formed on one side of the main body case.

The motor 270 may operate under the control of the processor 260 to drive the fan 250. The fan 250 may suction external air and may deliver the external air to the foreign matter filter 230. The foreign matter filter 230 may filter the air suctioned by the fan 250 and may extract or separate foreign matter from the air flow. The interface circuit 210 may establish a communication channel with the electronic device 100 and may receive sensing information related to foreign matter from the electronic device 100. The interface circuit 210 may include, for example, a circuit capable of supporting at least one of USB wired connection or short-range wireless communication connection. The foreign matter removal device 200 may perform wireless charging of the electronic device 100 using the wireless charging coil 240 and the charging circuit 245 during removal of foreign matter.

According to various embodiments, under the control of the processor 260, the motor 270 may operate such that the fan 250 is driven in the opposite direction. For example, when the electronic device 100 is wirelessly charged, the fan 250 may be driven in the reverse direction under the control of the processor 260 to deliver wind or airflow to the electronic device 100 placed on the foreign matter removal device 200. Based on this, the foreign matter removal device 200 may lower heat that is likely to occur during a wireless charging operation of the electronic device 100. That is, the fan 250 may be operated to generate an airflow that passes through or along the electronic device 100 to provide cooling thereto.

According to various embodiments, the foreign matter removal device 200 may include a temperature measurement sensor, or may receive temperature information of the electronic device 100 from the electronic device 100. In some such configurations, when the received temperature is higher than or equal to a specified value, the foreign matter removal device 200 may operate the motor 270 for driving of the fan 250 in the reverse direction and may control device cooling (e.g., cooling of at least one of the electronic device 100 or the foreign matter removal device 200) using the fan 250.

According to various embodiments, when the electronic device 100 is seated on the foreign matter removal device 200, the first suction unit 203a may be inserted into or fluidly connected to the first housing air passage 810 of the electronic device 100, and the second suction unit 203b may be inserted into or fluidly connected to the second housing air passage 820. In this regard, at least a portion of the first suction unit 203a and at least a portion of the second suction unit 203b may include a passage that is formed to be thinner than the size of the first housing air passage 810 or the second housing air passage 820 and is capable of suctioning external air.

The foreign matter removal device 200, when the electronic device 100 is mounted thereon, may recognize the mounting of the electronic device 100. In this regard, the foreign matter removal device 200 may include a pressure sensor disposed in at least one of the first suction unit 203a or the second suction unit 203b and may determine whether the electronic device 100 is mounted, through sensing of the pressure sensor. According to various embodiments, the foreign matter removal device 200 may transmit a ping command through the interface circuit 210 every predetermined period and may determine whether the electronic device 100 is mounted, depending on a response of the electronic device 100 to the ping command. According to various embodiments, the foreign matter removal device 200 may determine whether the electronic device 100 is mounted on the foreign matter removal device 200, through a Hall sensor, a proximity sensor (e.g., an infrared sensor), or short-range communication (e.g., NFC). When the foreign matter removal device 200 includes a Hall sensor, the electronic device 100 may include an element capable of generating a magnetic force or field at the position where the electronic device 100 is mounted on the foreign matter removal device 200.

The foreign matter removal device 200 may communicate with the electronic device 100 and may receive information about whether foreign matter is present in the hinge area and the amount of accumulated foreign matter from the electronic device 100. In some embodiments, when the amount of accumulated foreign matter is greater than or equal to a specified magnitude (e.g., 70% or more), the foreign matter removal device 200 may automatically drive the motor 270 to perform suction and remove the foreign matter from the hinge area. The electronic device 100, when mounted on the foreign matter removal device 200, may output information about the remaining amount of charge and the amount of accumulated foreign matter.

According to various embodiments, even when the amount of accumulated foreign matter is less than the specified magnitude (e.g., 70%), the foreign matter removal device 200 may control operation of the motor 270 to remove the foreign matter under the control of the electronic device 100 when receiving a request for the removal of the foreign matter. In this regard, the foreign matter removal device 200 may further include an input unit, such as a physical button or a touch button, for activating or deactivating a foreign matter removal operation. According to various embodiments, the foreign matter removal device 200 may further include a touch screen supporting a touch function (or, a panel supporting an electronic pen input function). The foreign matter removal device 200 may output a virtual object (e.g., an icon or a menu) for controlling activation or deactivation related to the foreign matter removal operation, based on a unit supporting the touch function and may perform activation or deactivation of the foreign matter removal operation in response to a selection of the corresponding virtual object.

The foreign matter removal device 200 may receive information about the amount of accumulated foreign matter from the electronic device 100 while performing the control of the motor 270 for removal of the foreign matter and may perform a foreign matter removal operation when the amount of accumulated foreign matter is greater than or equal to a specified minimum amount of accumulation. In this regard, when the amount of accumulated foreign matter is reduced from a first magnitude (e.g., 70%) to a second magnitude (e.g., 10%), the electronic device 100 may transfer information about the reduction to the foreign matter removal device 200. Alternatively, the foreign matter removal device 200 may receive information about the size of foreign matter from the electronic device 100 and may perform a foreign matter removal operation when the received size of foreign matter is greater than or equal to a specified minimum size. In this regard, the electronic device 100 may include a sensor for sensing the size of foreign matter and may determine the size of foreign matter based on information collected by the sensor. According to various embodiments, the foreign matter removal device 200 may further include an illuminance sensor for detecting ambient illuminance, and when external illuminance is greater than or equal to specified illuminance (when a fluorescent lamp is turned on, or when illuminance corresponding to morning or afternoon is detected), the foreign matter removal device 200 may control operation of the motor 270 for removal of foreign matter. When the external illuminance is less than the specified illuminance, the foreign matter removal device 200 may perform a foreign matter removal operation through user confirmation (e.g., a user input).

According to various embodiments, the electronic device 100 may selectively perform transfer of information about the amount of accumulated foreign matter depending on external illuminance or time. For example, even when the amount of accumulated foreign matter is greater than or equal to a specified magnitude, the electronic device 100 may selectively transfer request information for removal of the foreign matter to the foreign matter removal device 200 depending on the external illuminance or the current time. According to an embodiment, when the external illuminance is less than a specified magnitude or the current time corresponds to late evening or night time, the electronic device 100 may determine that a user sleeps and may not transfer the request information for removal of the foreign matter, or may transfer the request information for removal of the foreign matter to the foreign matter removal device 200 after user confirmation (e.g., output of a pop-up window for asking whether to remove the foreign matter and reception of a user input).

Figure 8B:
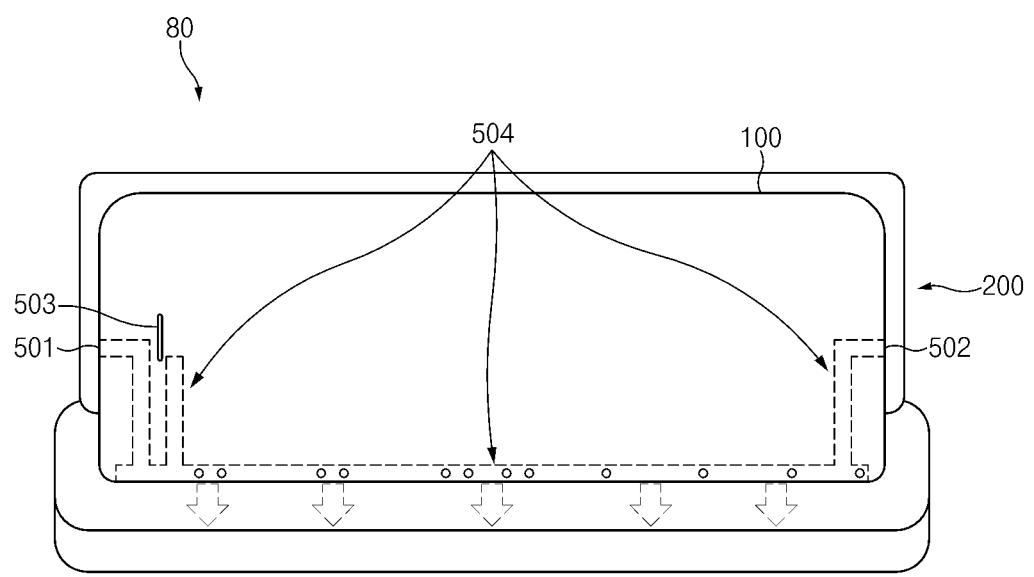
FIG. 8B is a view illustrating one example of a foreign matter removal situation of the foreign matter removal system according to various embodiments.

FIG. 8B is a view illustrating one example of a foreign matter removal situation of the foreign matter removal system according to various embodiments.

Referring to FIGS. 8A-8B, when the foreign matter removal device 200 included in the foreign matter removal system 80 performs control of the motor 270 for removal of foreign matter, foreign matter located in the electronic device 100 may be released outside the electronic device 100 through an air vent 504 (or, an air inflow passage) as described above. In this regard, the electronic device 100 may include holes, such as a first speaker hole 501, a second speaker hole 502, and a receiver hole 503, through which external air is introduced into the electronic device 100. The first speaker hole 501, the second speaker hole 502, and the receiver hole 503 may be connected to the air vent 504, and the air vent 504 may be connected with housing air passages (e.g., the housing air passages 810 and 820 of FIG. 8A). A first suction unit and a second suction unit of the foreign matter removal device 200 (e.g., the suction units 203a and 203b of FIG. 8A) may be connected to the housing air passages. When the fan 250 connected to the suction units 203a, 203b is operated by the motor 270, external air may be introduced into the first speaker hole 501, the second speaker hole 502, and the receiver hole 503, and the introduced air may be supplied into the cavities 510_1 and 520_1 disposed in the first housing 510 and the second housing 520 through the air vent 504 (or, an air outflow passage). As a result, foreign matter accumulated in the cavities 510_1 and 520_1 may be suctioned into the suction units 203a and 203b through the housing air passages 810 and 820.

A foreign matter removal device for removing foreign matter in an electronic device according to an embodiment may include a suction connector (or, a suction unit) inserted into a gap between a first housing and a hinge housing and a gap between a second housing and the hinge housing in a folded state of the electronic device, a fan and a motor that suction dust introduced into the hinge housing through the suction connector, and a dust filter bag that stores the suctioned dust.

According to various embodiments, the foreign matter removal device may include a sub-communication circuit that establishes a communication channel with the electronic device and a sub-processor (e.g., the processor 260) that receives the amount of accumulated dust from the electronic device through the sub-communication circuit and controls operations of the fan and the motor depending on the received amount of accumulated dust.

According to various embodiments, the foreign matter removal device may further include a wireless charging circuit (e.g., the wireless charging coil antenna 240 and the charging circuit 245) that wirelessly charges a battery of the electronic device while the electronic device is inserted into the suction connector.

FIGS. 9A-9B illustrate one example of an air passage of the electronic device 100 related to removal of foreign matter according to various embodiments.

Referring to FIGS. 9A-9B, the electronic device 100 according to an embodiment may include the first housing 510, the second housing 520, and the hinge housing disposed between the first housing 510 and the second housing 520 and disposed under the first housing 510 and the second housing 520 in a flat state of the electronic device 100. A first battery 131 may be disposed on one side of the first housing 510, and a second battery 132 may be disposed on one side of the second housing 520. According to an embodiment, the electronic device 100 may include a first air container 910 disposed on the first battery 131 and a second air container 920 disposed on the second battery 132.

According to an embodiment, and as shown in FIG. 9B, a first speaker hole 501, a second speaker hole 502, and a connector hole 505 may be disposed in the second housing 520. As shown, a second circuit board 620 may be disposed inside the second housing 520, and a first speaker circuit 171 and a second speaker circuit 172 may be disposed on the second circuit board 620. The electronic device 100 may include a first suction air vent 501_a (or, an air inflow passage) connecting the first speaker circuit 171 and the second air container 920, a second suction air vent 502_a connecting the second speaker circuit 172 and the second air container 920, and a third suction air vent 505_a connecting the connector hole 505 and the second air container 920. According to various embodiments, the electronic device 100 may include a first suction valve 501_b disposed between the first suction air vent 501_a and the second air container 920, a second suction valve 502_b disposed between the second suction air vent 502_a and the second air container 920, and a third suction valve 505_b disposed between the third suction air vent 505_a and the second air container 920. The first suction valve 501_b, the second suction valve 502_b, and the third suction valve 505_b may operate such that external air is introduced into the second air container 920 through the first speaker hole 501, the second speaker hole 502, and the connector hole 505 and air in the second air container 920 is not released toward the first speaker hole 501, the second speaker hole 502, and the connector hole 505.

According to various embodiments, the electronic device 100 may include release valves 132_a disposed on one side of the second air container 920 and release suction air vents 132_b (or, air outflow passages) connected with the release valves 132_a. The release suction air vents 132_b may be connected with a fourth cavity 520_1 of the electronic device 100 formed on one side of the second housing 520. The release valves 132_a may operate such that air is not introduced into the second air container 920 from the fourth cavity 520_1 and air accumulated in the second air container 920 is released to the fourth cavity 520_1.

Although the suction valves and the release valves connected to the second air container 920 disposed in the second housing 520, at least one suction hole (e.g., the first speaker hole 501, the second speaker hole 502, and the connector hole 505) connected with the suction valves, and the release air vents connected with the release valves have been described above, the disclosure is not limited this the specific illustrative configuration. For example, components (e.g., at least one a suction hole, a suction valve, a release valve, or a release hole) identical or similar to at least one of the suction hole, the suction valve, the release valve, or the release hole formed in relation to the second air container 920 of the second housing 520 may be formed in the first air container 910 disposed in the first housing 510, and dust in a third cavity 510_1 disposed in the first housing 510 of the electronic device 100 may be released to the outside through a housing air passage.

FIGS. 10A-D illustrate an example of a partial configuration of the electronic device 100 related to manual removal of foreign matter according to various embodiments.

Figure 10A:
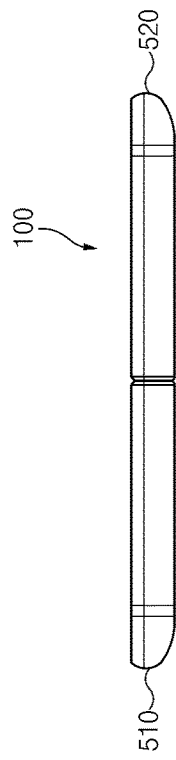
FIG. 10A is a view illustrating one example of a partial configuration of the electronic device related to manual removal of foreign matter according to various embodiments.
Figure 10B:
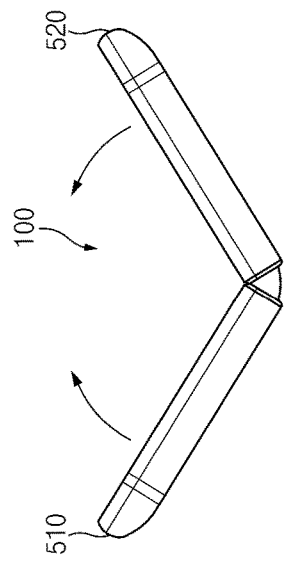
FIG. 10B illustrates the electronic device 10B transitioning from the flat state to the folded state.

Referring to FIGS. 10A-D, various states of the electronic device 100 are shown. FIG. 10A illustrates the electronic device 100 in state 1001, which is an operational state of the electronic device 100 according to an embodiment, and illustrates the flat state thereof. The electronic device 100 may be changed from a folded state to a flat state or vice versa, as shown in FIG. 10B (state 1005). In the open state 1001, an upper surface of the first housing 510 and an upper surface of the second housing 520 may be disposed side by side to face one direction.

Figure 10C:
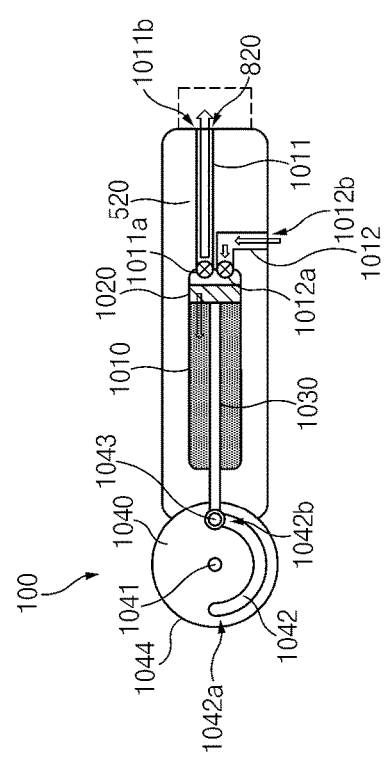
FIG. 10C illustrates features of an electronic device according to various embodiments.
Figure 10D:
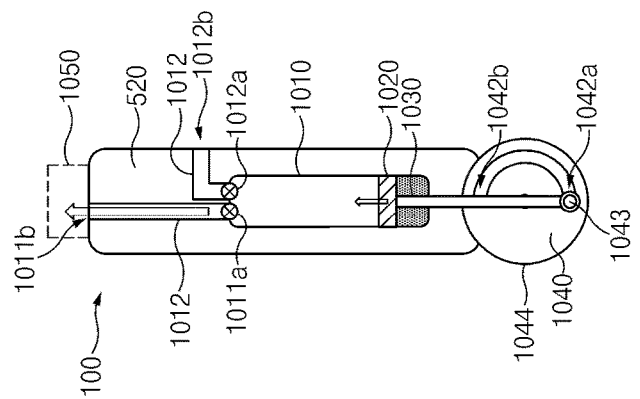
FIG. 10D illustrates the electronic device of FIG. 10C illustrated in an alternative orientation.

Referring now to FIGS. 10C-10D a configuration of an electronic device is shown. The electronic device 100, as shown, may include a third air container 1010 disposed in the second housing 520 (or, the first housing 510), a packing header 1020 disposed in the third air container 1010, an arm part 1030 (e.g., a shaft) connected to the packing header 1020, a disc cam 1040 connected with one side of the arm part 1030, an air inflow passage 1012, an air outflow passage 1011, an air inlet 1012b, an air inlet valve 1012a, an air outlet 1011b, and an air outlet valve 1011a. The disc cam 1040 may include, for example, a circular body 1044, a fixing part 1041, an arm movement hole 1042 (or, a groove), and an arm fastening part 1043. The disc cam 1040 may be rotated in conjunction with a gear of a hinge structure during a folding or unfolding operation of the electronic device 100. The system described with respect to FIGS. 10A-10D may be a pump-type configuration where air is pulled into the electronic device 100 (e.g., within the third air container 1010) and then force out from the third air container 1010 to clear foreign matter from one or more cavities within the electronic device 100.

The disc cam 1040 may be disposed on at least one side in the hinge housing 530, or may be integrally configured with the air container 1010. The fixing part 1041 may serve to fix the circular body 1044 to one side of the second housing 520 of the electronic device 100. The arm movement hole 1042 may be provided, for example, in a semi-circular arc shape. One end of the arm part 1030 may be fastened through the arm fastening part 1043 in the arm movement hole 1042 of the circular body 1044 and may move from a first point 1042b to a second point 1042a along the arm movement hole 1042 while the electronic device 100 performs an unfolding operation in a folded state. When the disc cam 1040 rotates and the arm part 1030 is moved from the first point 1042b to the second point 1042a of the arm movement hole 1042 while the electronic device 100 performs the unfolding operation in the folded state, the arm part 1030 fastened through the arm fastening part 1043 fastened to the arm movement hole 1042 may perform an operation (an operation of suctioning air in the third air container 1010) in the direction toward the disc cam 1040. In this case, external air may be introduced into the third air container 1010 through the air inlet 1012b while the packing header 1020 connected to the arm part 1030 moves to one end of the third air container 1010. At this time, the air inlet valve 1012a may be opened while air is introduced from the outside, and the air outlet valve 1011a may be closed while the air inlet valve 1012a is opened. Meanwhile, while the packing header 1020 is moved in the opposite direction (e.g., the direction toward the air outlet 1011b), the air inlet valve 1012a may close the air inflow passage 1012.

As in state 1005 (FIG. 10B), the electronic device 100 may be changed from a flat state to a bent state (or, a folded state) (e.g., state 1003 in FIG. 10C) in response to external pressure. For example, while the first housing 510 and the second housing 520 are folded with a predetermined angle smaller than a horizontal angle in a flat state (e.g., a horizontal angle state), the disc cam 1040 may rotate in the counterclockwise direction as in state 1007 (FIG. 10D). When the disc cam 1040 rotates in the counterclockwise direction, the arm part 1030 fastened to the arm movement hole 1042 of the disc cam 1040 may be moved from the second point 1042a to the first point 1042b. In response, the arm part 1030 may move the packing header 1020 in the direction toward an opposite end of the third air container 1010 (e.g., the air outflow passage 1012), and air in the third air container 1010 may be released to a cavity 1050 through the air outflow passage 1012. In this operation, the air outlet valve 1011a may be opened, and the air inlet valve 1012a may be closed. As in the above description, the electronic device 100, while performing an unfolding operation in a folded state, may introduce external air thereinto and may store the external air in the third air container 1010, and while the electronic device 100 performs a folding operation in a flat state, air stored in the third air container 1010 may be released through the cavity 1050, and foreign matter accumulated in the cavity 1050 may be released to the outside (e.g., the housing air passages 810 and 820).

Although the above description has been made based on the second housing 520 in relation to the above-described structure, an air container structure, a disc cam, and air suction and release structures that are the same as, or similar to, those described above may be disposed in the second housing 520.

As described above, an electronic device according to an embodiment may include a first housing 510, a second housing 520, a display 110 disposed on the first housing and the second housing, a hinge structure 541 that supports a hinge operation, at least a portion of the hinge structure 541 being disposed between the first housing 510 and the second housing 520, a hinge housing 530 in which at least a portion of the hinge structure 541 is seated, and at least one cavity structure 571 (e.g., at least one of 571_1, 572_1 shown in FIG. 3B, 570_1-6 shown in FIG. 3A, and/or third cavity structure 570a, fourth cavity structure 570b shown in FIG. 4B) that includes at least one cavity formed in at least a partial area of at least one of the hinge housing 530, the first housing 510, or the second housing 520 and prevents flow or diffusion of introduced dust, dirt, or other foreign matter.

According to various embodiments, the cavity structure may include a first sidewall that extends from a bottom surface of the hinge housing and a second sidewall that extends from an upper end of the first sidewall in a direction toward the hinge housing, and a gap may be formed between the second sidewall and an edge of the hinge housing.

According to various embodiments, the cavity structure may include a first cavity structure disposed at one edge of the hinge housing and a second cavity structure disposed at one edge of the hinge housing and located to be spaced apart from the first cavity structure by a predetermined gap.

According to various embodiments, the electronic device may further include a third cavity formed at an edge adjacent to the second housing in an unfolded state of the electronic device among edges of the first housing, a first sealing member that covers at least a portion of the third cavity, a fourth cavity formed at an edge adjacent to the first housing in the unfolded state among edges of the second housing, and a second sealing member that covers at least a portion of the fourth cavity.

According to various embodiments, at least a portion of the first sealing member may be disposed to cover a gap between the first housing and the hinge housing, and at least a portion of the second sealing member may be disposed to cover a gap between the second housing and the hinge housing.

According to various embodiments, the electronic device may further include a foreign matter detection sensor that is disposed in at least one of the first to fourth cavities and that senses whether foreign matter is introduced or an amount of the introduced foreign matter accumulated.

According to various embodiments, the electronic device may further include a processor functionally connected with the foreign matter detection sensor, and the processor may be configured to output information corresponding to whether foreign matter is present or the amount of accumulated foreign matter, depending on sensing information received from the foreign matter detection sensor.

According to various embodiments, the electronic device may further include a display that outputs the information corresponding to whether the foreign matter is present or the amount of accumulated foreign matter in response to control of the processor.

According to various embodiments, the electronic device may further include a processor functionally connected with the foreign matter detection sensor, and the processor may be configured to output a foreign matter removal alarm when the amount of the accumulated foreign matter is greater than or equal to a first magnitude.

According to various embodiments, the electronic device may further include a first guide member disposed on at least a portion of an area of an edge portion of the hinge housing facing the first housing in a folded state of the electronic device.

According to various embodiments, the first guide member may include a fiber member (or, a fiber structure) disposed to protrude by a predetermined length from an area of an outer surface of the hinge housing corresponding to a third cavity disposed in a first housing.

According to various embodiments, the electronic device may further include a guide member formed on at least a portion of an area of an edge portion of the hinge housing facing the first housing in a folded state of the electronic device.

According to various embodiments, the electronic device may further include a second guide member disposed on at least a portion of an area of an edge portion of the hinge housing facing the second housing in a folded state of the electronic device.

According to various embodiments, the second guide member may include a fiber member (or, a fiber structure) disposed to protrude by a predetermined length from an area of an outer surface of the hinge housing corresponding to a fourth cavity disposed in a second housing.

According to various embodiments, the electronic device may further include a guide member formed on at least a portion of an area of an edge portion of the hinge housing facing the second housing in a folded state of the electronic device.

According to various embodiments, the electronic device may further include at least one air inflow passage through which external air is introduced from an edge of the first housing, an air container in which air introduced through the air inflow passage is stored, and at least one air release passage through which air stored in the air container is released to at least one of the first to fourth cavities.

According to various embodiments, the electronic device may further include a first valve by which air is introduced from the outside through the air inflow passage and that operates such that air of the air container is not released through the air inflow passage.

According to various embodiments, the electronic device may further include a second valve by which air stored in the air container is released through an air release passage and that operates such that air is not introduced into the air container through the air release passage.

According to various embodiments, the electronic device may further include a pump structure that generates pressure for a flow of air of the air container by a hinge operation of the first housing and the second housing.

According to various embodiments, the pump structure may include a packing header that moves in the air container, a shaft connected with the packing header, a disc cam connected to the shaft, and a fixing part that fixes the disc cam to one side of the housing, and the disc cam may be connected with the hinge structure to rotate.

Figure 11:
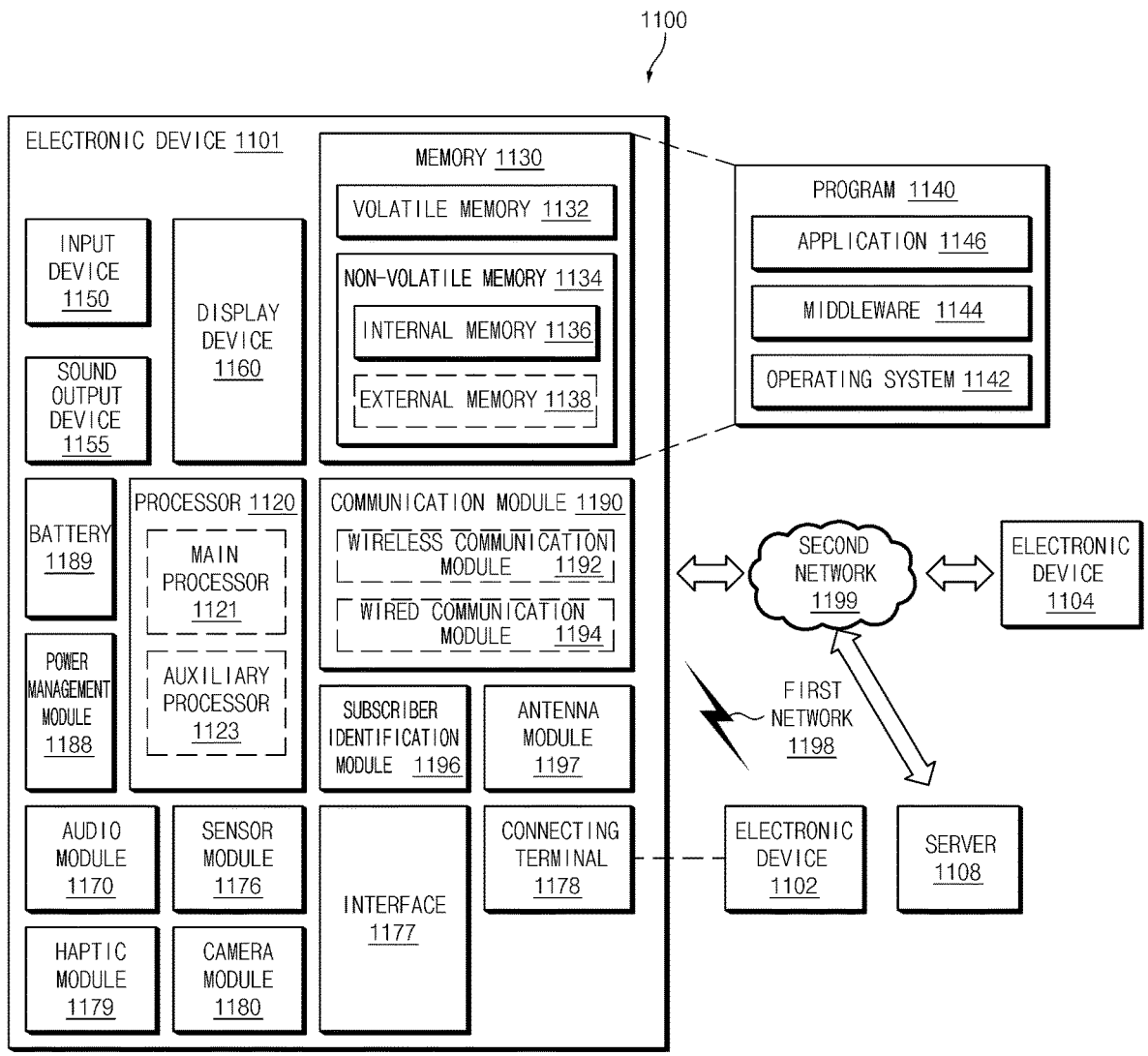
FIG. 11 is a block diagram of an electronic device 1101 in a network environment 1100 according to various embodiments.

FIG. 11 is a block diagram of an electronic device 1101 in a network environment 1100 according to various embodiments.

Referring to FIG. 11, the electronic device 1101 may communicate with an electronic device 1102 through a first network 1198 (e.g., a short-range wireless communication network) or may communicate with an electronic device 1104 or a server 1108 through a second network 1199 (e.g., a long-distance wireless communication network) in a network environment 1100. According to an embodiment, the electronic device 1101 may communicate with the electronic device 1104 through the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, or an antenna module 1197. According to some embodiments, at least one (e.g., the display device 1160 or the camera module 1180) among components of the electronic device 1101 may be omitted or one or more other components may be added to the electronic device 1101. According to some embodiments, some of the above components may be implemented with one integrated circuit. For example, the sensor module 1176 (e.g., a fingerprint sensor, an iris sensor, or an illuminance sensor) may be embedded in the display device 1160 (e.g., a display).

The processor 1120 may execute, for example, software (e.g., a program 1140) to control at least one of other components (e.g., a hardware or software component) of the electronic device 1101 connected to the processor 1120 and may process or compute a variety of data. According to an embodiment, as a part of data processing or operation, the processor 1120 may load a command set or data, which is received from other components (e.g., the sensor module 1176 or the communication module 1190), into a volatile memory 1132, may process the command or data loaded into the volatile memory 1132, and may store result data into a nonvolatile memory 1134. According to an embodiment, the processor 1120 may include a main processor 1121 (e.g., a central processing unit or an application processor) and an auxiliary processor 1123 (e.g., a graphic processing device, an image signal processor, a sensor hub processor, or a communication processor), which operates independently from the main processor 1121 or with the main processor 1121. Additionally or alternatively, the auxiliary processor 1123 may use less power than the main processor 1121, or is specified to a designated function. The auxiliary processor 1123 may be implemented separately from the main processor 1121 or as a part thereof.

The auxiliary processor 1123 may control, for example, at least some of functions or states associated with at least one component (e.g., the display device 1160, the sensor module 1176, or the communication module 1190) among the components of the electronic device 1101 instead of the main processor 1121 while the main processor 1121 is in an inactive (e.g., sleep) state or together with the main processor 1121 while the main processor 1121 is in an active (e.g., an application execution) state. According to an embodiment, the auxiliary processor 1123 (e.g., the image signal processor or the communication processor) may be implemented as a part of another component (e.g., the camera module 1180 or the communication module 1190) that is functionally related to the auxiliary processor 1123.

The memory 1130 may store a variety of data used by at least one component (e.g., the processor 1120 or the sensor module 1176) of the electronic device 1101. For example, data may include software (e.g., the program 1140) and input data or output data with respect to commands associated with the software. The memory 1130 may include the volatile memory 1132 or the nonvolatile memory 1134.

The program 1140 may be stored in the memory 1130 as software and may include, for example, an operating system 1142, a middleware 1144, or an application 1146.

The input device 1150 may receive a command or data, which is used for a component (e.g., the processor 1120) of the electronic device 1101, from an outside (e.g., a user) of the electronic device 1101. The input device 1150 may include, for example, a microphone, a mouse, a keyboard, or a digital pen (e.g., a stylus pen).

The sound output device 1155 may output a sound signal to the outside of the electronic device 1101. The sound output device 1155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 1160 may visually provide information to the outside (e.g., the user) of the electronic device 1101. For example, the display device 1160 may include a display, a hologram device, or a projector and a control circuit for controlling a corresponding device. According to an embodiment, the display device 1160 may include a touch circuitry configured to sense the touch or a sensor circuit (e.g., a pressure sensor) for measuring an intensity of pressure on the touch.

The audio module 1170 may convert a sound and an electrical signal in dual directions. According to an embodiment, the audio module 1170 may obtain the sound through the input device 1150 or may output the sound through the sound output device 1155 or an external electronic device (e.g., the electronic device 1102 (e.g., a speaker or a headphone)) directly or wirelessly connected to the electronic device 1101.

The sensor module 1176 may generate an electrical signal or a data value corresponding to an operating state (e.g., power or temperature) inside or an environmental state (e.g., a user state) outside the electronic device 1101. According to an embodiment, the sensor module 1176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1177 may support one or more designated protocols to allow the electronic device 1101 to connect directly or wirelessly to the external electronic device (e.g., the electronic device 1102). According to an embodiment, the interface 1177 may include, for example, an HDMI (high-definition multimedia interface), a USB (universal serial bus) interface, an SD card interface, or an audio interface.

A connecting terminal 1178 may include a connector that physically connects the electronic device 1101 to the external electronic device (e.g., the electronic device 1102). According to an embodiment, the connecting terminal 1178 may include, for example, an HDMI connector, a USB connector, an SD card connector, or an audio connector (e.g., a headphone connector).

The haptic module 1179 may convert an electrical signal to a mechanical stimulation (e.g., vibration or movement) or an electrical stimulation perceived by the user through tactile or kinesthetic sensations. According to an embodiment, the haptic module 1179 may include, for example, a motor, a piezoelectric element, or an electric stimulator.

The camera module 1180 may shoot a still image or a video image. According to an embodiment, the camera module 1180 may include, for example, at least one or more lenses, image sensors, image signal processors, or flashes.

The power management module 1188 may manage power supplied to the electronic device 1101. According to an embodiment, the power management module 388 may be implemented as at least a part of a power management integrated circuit (PMIC).

The battery 1189 may supply power to at least one component of the electronic device 1101. According to an embodiment, the battery 1189 may include, for example, a non-rechargeable (primary) battery, a rechargeable (secondary) battery, or a fuel cell.

The communication module 1190 may establish a direct (e.g., wired) or wireless communication channel between the electronic device 1101 and the external electronic device (e.g., the electronic device 1102, the electronic device 1104, or the server 1108) and support communication execution through the established communication channel. The communication module 1190 may include at least one communication processor operating independently from the processor 1120 (e.g., the application processor) and supporting the direct (e.g., wired) communication or the wireless communication. According to an embodiment, the communication module 1190 may include a wireless communication module 1192 (e.g., a cellular communication module, a short-range wireless communication module, or a GNSS (global navigation satellite system) communication module) or a wired communication module 1194 (e.g., an LAN (local area network) communication module or a power line communication module). The corresponding communication module among the above communication modules may communicate with the external electronic device through the first network 1198 (e.g., the short-range communication network such as a Bluetooth, a WiFi direct, or an IrDA (infrared data association)) or the second network 1199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 1192 may identify and authenticate the electronic device 1101 using user information (e.g., international mobile subscriber identity (IMSI)) stored in the subscriber identification module 1196 in the communication network, such as the first network 1198 or the second network 1199.

The antenna module 1197 may transmit or receive a signal or power to or from the outside (e.g., the external electronic device) of the electronic device 1101. According to an embodiment, the antenna module may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1101 and the external electronic device 1104 through the server 1108 connected to the second network 1199. Each of the electronic devices 1102 and 1104 may be the same or different types as or from the electronic device 1101. According to an embodiment, all or some of the operations performed by the electronic device 1101 may be performed by one or more external devices among the external electronic devices 1102, 1104, or 1108. For example, when the electronic device 1101 performs some functions or services automatically or by request from a user or another device, the electronic device 1101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 1101. The electronic device 1101 may provide the result as is or after additional processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance.

The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part", "circuit", or the like. The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 1140) including an instruction stored in a machine-readable storage medium (e.g., an internal memory 1136 or an external memory 1138) readable by a machine (e.g., the electronic device 1101). For example, the processor (e.g., the processor 1120) of a machine (e.g., the electronic device 1101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

What is claimed is:

1. An electronic device comprising:
   a first housing;
   a second housing;
   a display disposed on the first housing and the second housing;
   a plurality of hinge structures configured to support a hinge operation, the plurality of hinge structures including a first hinge structure, a second hinge structure and a third hinge structure, wherein the plurality of hinge structures are disposed along a folding axis extending between the first housing and the second housing, and where the first hinge structure is disposed adjacent a first end of the first housing and the second housing, the second hinge structure is disposed on a second end of the first housing and the second housing and the third hinge structure is disposed between the first hinge structure and the second hinge structure;
   a hinge housing in which at least a portion of the plurality of hinge structures are seated, wherein the hinge housing covers the plurality of hinge structures;
   a cavity structure including at least one cavity disposed in at least a partial area of at least one of the hinge housing, the first housing, or the second housing, and
   at least one sealing member, wherein the at least one sealing member is configured to cover at least a portion of at least one of the at least one cavity,
   wherein the cavity structure includes:
   a first cavity structure including a first cavity disposed within the hinge housing to be proximate one side of the hinge housing and configured to prevent flow or diffusion of introduced foreign matter; and
   a second cavity structure including a second cavity disposed within the hinge housing to be proximate an other side of the hinge housing and located to be spaced apart from the first cavity structure by a predetermined gap, the second cavity structure being configured to prevent flow or diffusion of introduced foreign matter.

2. The electronic device of claim 1, wherein the cavity structure includes:
   a first sidewall configured to extend from a bottom surface of the hinge housing; and a second sidewall configured to extend from an upper end of the first sidewall in a direction toward the hinge housing, wherein a gap is formed between the second sidewall and an edge of the hinge housing.

3. The electronic device of claim 1, wherein the at least one cavity includes,
- a third cavity formed at an edge of the first housing disposed adjacent to the second housing in an unfolded state of the electronic device; and
- a fourth cavity formed at an edge of the second housing disposed adjacent to the first housing in the unfolded state; and wherein the at least one sealing member includes,
- a first sealing member configured to cover at least a portion of the third cavity, and
- a second sealing member configured to cover at least a portion of the fourth cavity.

4. The electronic device of claim 3, wherein at least a portion of the first sealing member is disposed to cover a gap between the first housing and the hinge housing, and wherein at least a portion of the second sealing member is disposed to cover a gap between the second housing and the hinge housing.

5. The electronic device of claim 3, further comprising:
a foreign matter detection sensor disposed in at least one of the first, second, third, or fourth cavities and configured to sense whether foreign matter is introduced into the respective cavity or sense an amount of foreign matter accumulated in the respective cavity.

6. The electronic device of claim 5, further comprising:
a processor functionally connected with the foreign matter detection sensor, wherein the processor is configured to output information corresponding to whether the foreign matter is present in the respective cavity or the amount of the accumulated foreign matter, depending on sensing information received from the foreign matter detection sensor.

7. The electronic device of claim 6, further comprising:
a display configured to output the information corresponding to whether the foreign matter is present or the amount of the accumulated foreign matter in response to control of the processor.

8. The electronic device of claim 5, further comprising:
a processor functionally connected with the foreign matter detection sensor, wherein the processor is configured to output a foreign matter removal alarm when an amount of the accumulated foreign matter is greater than or equal to a first magnitude.

9. The electronic device of claim 3, further comprising:
a first guide member disposed on at least a portion of an area of an edge portion of the hinge housing facing the first housing, wherein the first guide member includes a fiber member disposed to protrude by a predetermined length from an area of an outer surface of the hinge housing corresponding to the third cavity defined in the first housing.

10. The electronic device of claim 3, further comprising at least one of:
- a first guide pattern formed on at least a portion of an area of an edge portion of the hinge housing facing the first housing; or
- a second guide pattern formed on at least a portion of an area of an edge portion of the hinge housing facing the second housing.

11. The electronic device of claim 3, further comprising:
a second guide member disposed on at least a portion of an area of an edge portion of the hinge housing facing the second housing, wherein the second guide member includes a fiber member disposed to protrude by a predetermined length from an area of an outer surface of the hinge housing corresponding to the fourth cavity disposed in a second housing.

12. The electronic device of claim 3, further comprising:
at least one air inflow passage through which external air is introduced inward from an edge of the first housing;
an air container in which air introduced through the air inflow passage is stored; and
at least one air release passage through which air stored in the air container is released to at least one of the first, second, third, or fourth cavities.

13. The electronic device of claim 12, further comprising at least one of:
- a first valve by which air is introduced from the outside through the air inflow passage, the first valve being configured to operate such that air of the air container is not released through the air inflow passage;
- a second valve by which air stored in the air container is released through the air release passage, the second valve being configured to operate such that air is not introduced into the air container through the air release passage, or
- a pump structure configured to generate pressure for a flow of air of the air container by a hinge operation of the first housing and the second housing.

14. The electronic device of claim 13, wherein when the electronic device includes the pump structure, the pump structure includes:
- a packing header configured to move in the air container;
- a shaft connected with the packing header;
- a disc cam connected to the shaft; and
- a fixing part configured to fix the disc cam to one side of the housing, wherein the disc cam is connected with the hinge structure to rotate.

* * * * *